United States Patent
Abe et al.

(10) Patent No.: US 6,248,281 B1
(45) Date of Patent: Jun. 19, 2001

(54) COMPRESSION APPARATUS FOR MOLDING, INJECTION COMPRESSION MOLDING MACHINE, AND INJECTION COMPRESSION MOLDING METHOD USING THE COMPRESSION DEVICE

(75) Inventors: Tomokazu Abe, Chiba; Tsuneo Matsui, Niigata, both of (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 09/308,131

(22) PCT Filed: Nov. 4, 1997

(86) PCT No.: PCT/JP97/04004

§ 371 Date: May 28, 1999

§ 102(e) Date: May 28, 1999

(87) PCT Pub. No.: WO98/21018

PCT Pub. Date: May 22, 1998

(30) Foreign Application Priority Data

Nov. 14, 1996 (JP) .................................................. 8-302914
Dec. 20, 1996 (JP) .................................................. 8-341214

(51) Int. Cl.⁷ .................................................. B29C 33/20
(52) U.S. Cl. .................................. 264/328.7; 425/451.7; 425/589; 425/595
(58) Field of Search ............................. 425/595, 589, 425/451.7, DIG. 221, DIG. 5; 264/328.7

(56) References Cited

U.S. PATENT DOCUMENTS

| | | | |
|---|---|---|---|
| 1,765,762 | * | 6/1930 | Hanna ..................................... 100/50 |
| 3,743,469 | * | 7/1973 | Gibbons ................................. 425/450 |
| 3,913,438 | * | 10/1975 | Walters et al. .......................... 83/529 |
| 4,184,835 | * | 1/1980 | Talbot ................................... 425/577 |
| 4,535,689 | * | 8/1985 | Pukowski ............................... 100/214 |
| 5,049,344 | * | 9/1991 | Sorenson ............................... 264/255 |
| 5,529,483 | * | 6/1996 | Abe et al. .............................. 425/589 |
| 5,811,135 | * | 9/1998 | Kimura ................................. 425/186 |

* cited by examiner

*Primary Examiner*—Harold Pyon
*Assistant Examiner*—Emmanuel Luk
(74) *Attorney, Agent, or Firm*—Oblon, Spivak, McClelland, Maier & Neustadt, P.C.

(57) ABSTRACT

A compression apparatus for molding which applies uniform compression force to molten resin, and facilitates downsizing of the overall compression apparatus and attachment of the compression apparatus to a molding machine. Also, an injection compression molding machine and an injection compression molding method which use the compression apparatus for molding are disclosed. The compression apparatus is disposed in the rear of the movable mold of a die of a molding machine in which the movable mold is advanced toward the stationary mold of the die in order to apply compression force to the charged molten resin, to thereby mold the molten resin. The compression apparatus has a function of generating a pressing force for pushing the movable mold toward the stationary mold. The compression apparatus includes first and second slant members and having respective slant faces and in surface contact with each other. The slant members are advanced toward the slant members in order to generate pressing fore. A plurality of slant members moving in the same direction are engaged with each other via a single interlock plate. This configuration enables synchronized movements of all the slant members. In addition, since the weight and size of the synchronization mechanism are decreased, attachment to the molding machine is facilitated. Further, slant portions moving in different directions are provided. Slant portions moving in the same direction are engaged with each other via the interlock plate, and slant portions moving in different directions are engaged with each other via a link. The employment of the above-described structure enables the object of the present invention to achieve more effectively.

18 Claims, 18 Drawing Sheets

US 6,248,281 B1

COMPRESSION APPARATUS FOR MOLDING, INJECTION COMPRESSION MOLDING MACHINE, AND INJECTION COMPRESSION MOLDING METHOD USING THE COMPRESSION DEVICE

BACKGROUND OF THE INVENTION

1. Field of the Invention

The present invention relates to a compression apparatus for molding which applies compression force to a resin within a die during injection compression molding or press molding. The present invention also relates to an injection compression molding machine and an injection compression molding method which use the compression apparatus for molding.

2. Discussion of the Background

In injection compression molding, molten resin is charged into the interior of a closed die, which is then subjected to die clamping in order to apply compression force onto the molten resin, to thereby complete molding.

In such injection compression molding, since low pressure is employed for injection of resin, no warpage or distortion is imparted to a molded article. Therefore, a molded article having excellent shape is advantageously manufactured even if the molded article has a small wall thickness.

Generally, a molding machine for injection compression molding includes a die composed of a movable mold and a stationary mold, a mold clamping apparatus, and a compression apparatus. The movable mold is movably provided in the molding machine. The stationary mold is fixed to the molding machine. The mold clamping apparatus advances the movable mold toward the stationary mold. The compression apparatus is adapted to compress molten resin which has been charged into the die.

Japanese Patent Application Laid-Open (kokai) Nos. 57-95429 and 60-122128 discloses conventional compression apparatuses. In these apparatuses, a movable portion for adjusting the volume of a die is provided in the interior of the die; and the movable portion is advanced via a pin which abuts the movable portion in order to reduce the volume of the die, to thereby compress molten resin charged into the die.

Such apparatuses disadvantageously have limited utility, since they do not enable injection compression molding by use of an ordinary die containing no movable portion.

To solve the above-mentioned problem, the present inventor has proposed a compression apparatus (Japanese Patent Application Laid-Open (kokai) No. 7-164500). As shown in FIG. 16, the proposed compression apparatus 95 is a unit comprising a mechanism for pushing a movable mold 91 toward a stationary mold 92, and is removably disposed between a die 93, composed of the movable mold 91 and the stationary mold 92, and a mold clamping apparatus 94. A clearance a shown in FIG. 16 has the same purpose as that of a clearance a shown in FIG. 1 as described below.

As shown in FIG. 17, the compression apparatus 95 has slant members 97 and 98 arranged along the compression direction. Each of the slant members 97 and 98 has a slant surface 96 slanted with respect to the compression direction. Of these slant members, the slant members 98 located at the side of the mold clamping apparatus 94 are moved perpendicular to the compression direction, to thereby generate compression force.

A plurality of pairs each comprising one slant member 97 and one slant member 98 are provided. As shown in FIG. 18, the slant members 98 which are made movable are arranged so as to form a square. A rack 99 for synchronization is provided on a side face of each of the slant members 98. A gear 100 for engaging the racks 99 is provided in the space surrounded by the slant members 98. The racks 99 and the gear 100 constitute a synchronization mechanism 101.

In the above-described compression apparatus 95, there is employed a mechanism which generates compression force by pushing the entirety of the movable mold 91. Therefore, the compression apparatus enables injection compression molding by use of an ordinary die containing no movable portion, so that utility is enhanced.

Also, since the motions of the slant members 98 are synchronized by means of the synchronization mechanism 101, no bias is produced in pushing force generated by the slant members 98, so that uniform compression force can be applied to the molten resin. As a result, a molded article having excellent dimensional precision and appearance is reliably molded.

However, the above-described compression apparatus 95 has an intricate structure in which the slant members 98 are arranged around the gear 100 of the synchronization mechanism 101, and each of the slant members 98 is engaged with the gear 100. Further, since a large drive force is applied to the slant members 98, a large torque is applied to the gear 100 of the synchronization mechanism 101. Therefore, the gear 100 must have a relatively large diameter, resulting in difficulty in reducing the size and weight of the compression apparatus.

Especially, in the case of molding of a large article, the compression apparatus may become considerably large and heavy, depending on the shape of the molded article. In this case, the compression apparatus cannot be attached to a molding machine.

SUMMARY OF THE INVENTION

In view of the foregoing, an object of the present invention is to provide a compression apparatus for molding which applies uniform compression force to molten resin, and facilitates downsizing of the overall compression apparatus and attachment of the compression apparatus to a molding machine. Another object of the present invention is to provide an injection compression molding machine and an injection compression molding method which use the compression apparatus for molding.

The present invention provides a compression apparatus for molding (first aspect) for applying compression force to a resin within a die during injection compression molding or press molding; and an injection compression molding machine (second aspect) and an injection compression molding method (third aspect) making use of the compression apparatus for molding.

According to the first aspect of the present invention, there is provided a compression apparatus for molding by use of a molding machine which includes a die comprising a movable mold and a stationary mold. In the molding machine, molten resin is charged into the die, and the movable mold is advanced so as to apply compression force to the molten resin, to thereby mold the molten resin. The compression apparatus is arranged in the rear of the movable mold. The compression apparatus includes first and second slant portions each of which has a slant face slanted with respect the advancement direction of the movable mold and which are arranged along the advancement direction of the movable mold. The slant face of the first slant portion is in surface contact with the slant face of the second slant portion. The first slant portion and the second slant portion are moved relative to each other in a direction perpendicular to the advancement direction of the movable mold, to thereby generate pushing force which pushes the movable mold toward the stationary mold. A plurality of sets each including the first slant portion and the second slant portions which move relative to each other in the same direction are provided in a plane which extends perpendicular to the advancement direction of the movable mold. The first slant portions or the second slant portions are engaged with a single interlock plate which is disposed to be movable in the moving direction of the slant portions.

In the compression apparatus, the interlock plate is preferably a plate-shaped rigid body which has an elongated hole extending along the moving direction of the slant portion, and a drive mechanism for driving the slant portion is preferably deposed inside the elongated hole.

The first and second slant portions may be disposed as follows. In addition to slant portions which move relative to each other in the same direction, slant portions which move relative to each other in a different direction are provided; and the latter slant portions are engaged with each other via a synchronization mechanism. In this case, groups of first or second slant portions which are generally engaged with their respective interlock plates may be engaged with one another via a synchronization mechanism. In this case, the synchronization mechanism preferably includes a link which is pivoted at its central portion and is engaged with the slant portions at its opposite end portions.

The interlock plate may include auxiliary slant portions each of which has a slant face having an angle of inclination equal to that of the slant members.

The auxiliary slant portions may be provided in a different manner. That is, one first slant portion and one second slant portion are provided in a plane perpendicular to the advancement direction of the movable mold, and the first slant portion or the second slant portion is engaged with a single interlock plate which is disposed to be movable in the moving direction of the slant portions. A first auxiliary slant portion (corresponding to the first slant portion) and a second auxiliary slant portion (corresponding to the second slant portion) are provided at positions spaced away from the first and second slant portions along the moving direction of the slant portions. One of the first and second auxiliary slant portions is fixed to the interlock plate. Each of the first and second auxiliary slant portions has a slant face which is slanted with respect to the advancement direction of the movable mold, and the slant faces of the first and second auxiliary slant portions are in surface contact with each other.

In this embodiment as well, the interlock plate is preferably a plate-shaped rigid body which has an elongated hole extending along the moving direction of the slant portion, and a drive mechanism for driving the slant portion is preferably deposed inside the elongated hole.

Further, a plurality of sets each including the first slant portion and the second slant portion which move relative to each other in the same direction are provided in a plane which extends perpendicular to the advancement direction of the movable mold. In this case, the slant portions having the same moving directions are preferably engaged with the same interlock plate.

Furthermore, a plurality of sets of each including the first slant portion and the second slant portion which move relative to each other in a different direction are provided in a plane which extends perpendicular to the advancement direction of the movable mold. In this case, each group of slant portions which moves in the same direction is engaged with an individual interlock plate, and the different groups are engaged with one another via a synchronization mechanism.

Preferably, the synchronization mechanism includes a link which is pivoted at its central portion and is engaged with the slant portions at its opposite end portions.

The second aspect of the present invention provides an injection compression molding machine which includes the compression apparatus for molding according to the first aspect of the present invention, and a die comprising a movable mold and a stationary mold. In the injection compression molding machine, molten resin is charged into the die and the movable mold is advanced so as to apply compression force to the molten resin, to thereby mold the molten resin. The injection compression molding machine is characterized by pushing the movable mold toward the stationary mold by means of the compression apparatus for molding so as to compress the molten resin which has been charged into the die.

The above-described injection compression molding machine is preferably constituted such that molten resin is injected into the interior of the die in a closed state with a clearance being left for further movement of the movable mold, and the compression apparatus then pushes the movable mold toward the stationary mold in order to apply compression force to the injected molten resin.

The third aspect of the present invention provides an injection compression molding method making use of the injection compression molding machine according to the second aspect of the present invention. The method includes charging molten resin into the die; and activating the compression apparatus to push the movable mold toward the stationary mold, to thereby compress the molten resin which has been injected into the die.

Preferably, in this method, the molten resin is injected into the interior of the die in a closed state and a clearance is left for the movable die to move further; and the compression apparatus is activated to push the movable mold toward the stationary mold for application of compression force to the molten resin such that the die is completely closed.

According to the present invention, all the slant members are synchronized with one another in motion, so that the timing of movement and moving distance become the same. As a result, uniform compression force is applied to the molten resin.

In an embodiment of the present invention, slant members which move in the same direction are engaged with each other via an interlock plate. Therefore, it is not necessary to engage all slant members with a synchronization mechanism in order to link the motions of slant members which move in different directions. That is, it is only required to engage a representative of slant members which move in a first direction with a representative of slant members which move in another direction. As a result, the overall synchronization mechanism can be simplified.

As the synchronization mechanism, there may be used any of a variety of mechanisms, such as a mechanism using a gear, a mechanism that includes a link which is pivoted at its central portion and is engaged with the slant portions at its opposite end portions, and a mechanism that synchronizes the motions by means of a belt. Therefore, the range of selection of usable synchronization mechanisms is broad. Through selection of the most appropriate type of synchronization mechanism, the weight and size of the compression apparatus are reduced and the area of the compression apparatus is increased, so that the above-mentioned objects are achieved.

Moreover, if the link member is provided in combination with the interlock plate, the structure of the synchronization mechanism is further simplified, and the weight and size of the synchronization mechanism are reliably reduced. Also, since the arrangement of the plurality of slant members can be arbitrarily selected, there can be obtained a compression apparatus which generates optimal compression force according to an article to be molded. Therefore, sufficient compression force is secured, even if the weight and size of the compression apparatus are reduced so as to facilitate attachment of the compression apparatus to a molding machine.

Especially, when a large-size molded article is molded, slant members in the number selected according to the size of the molded article can be easily arranged at the most appropriate positions for the shape of the article to be molded. Therefore, the number of the slant members can be minimized so that the compression apparatus does not become excessively large or heavy, resulting in easy attachment of the compression apparatus to a molding machine.

Also, in the injection compression molding method using the above-described injection compression molding machine, since the molten resin charged into the interior of the die is compressed by means of the above-described compression molding apparatus for molding, no limitation is imposed on the size of the article to be molded. Therefore, even if the size of the article to be molded is large, uniform compression force is secured, so that a molded article having excellent shape and dimensional precision can be manufactured through utilization of the advantage features of injection compression molding.

In another embodiment of the present invention, the first and second auxiliary slant portions are provided at positions spaced away from the first and second slant portions along the moving directions of the first and second slant portions, and at least one of the first and second auxiliary slant portions is fixed to the interlock plate. With this structure, the respective motions of the first and second auxiliary slant portions are linked with those of the first and second slant portions. Therefore, even if there is provided only one pair comprising the first slant portion and the second slant portion, the pushed regions of the movable mold can be dispersed to a plurality of positions by virtue of the first and second auxiliary slant portions. As a result, when the movable mold is advanced, well-balanced and unbiased pushing force is applied to the movable mold, so that the parallelism between the movable mold and the stationary mold is maintained.

Consequently, since the number of first and second slant portions and the number of first and second auxiliary slant portions can be minimized, and the number of drive mechanisms for driving the first and second slant portions can be minimized accordingly, if the first and second slant portions as well as the first and second auxiliary slant portions are arranged according to the shape of an article to be molded, the compression apparatus can be downsized and can be easily attached to the molding machine.

Also, since the compression apparatus is small, the compression apparatus can be attached to a small-sized injection compression molding machine, and a plurality of the compression apparatuses can be used for a large-size injection compression molding machine.

Further, in the injection compression molding method using the above-described injection compression molding machine, since the molten resin which has been charged into the die is compressed by means of the above-described compression apparatus for molding, well-balanced pushing force is applied to the movable mold, and the parallelism between the movable mold and the stationary mold is maintained. As a result, uniform compression force is applied to the molten resin so that a molded article having excellent shape and dimensional precision can be manufactured.

Furthermore, since the compression apparatus is small, the compression apparatus can be used to push a movable core provided in a large movable mold. Therefore, the compression apparatus can apply pushing force to a portion of the movable mold as needed, in such a case where molten resin is required to be partially compressed.

DETAILED DESCRIPTION OF THE PREFERRED EMBODIMENTS

Figure 1:
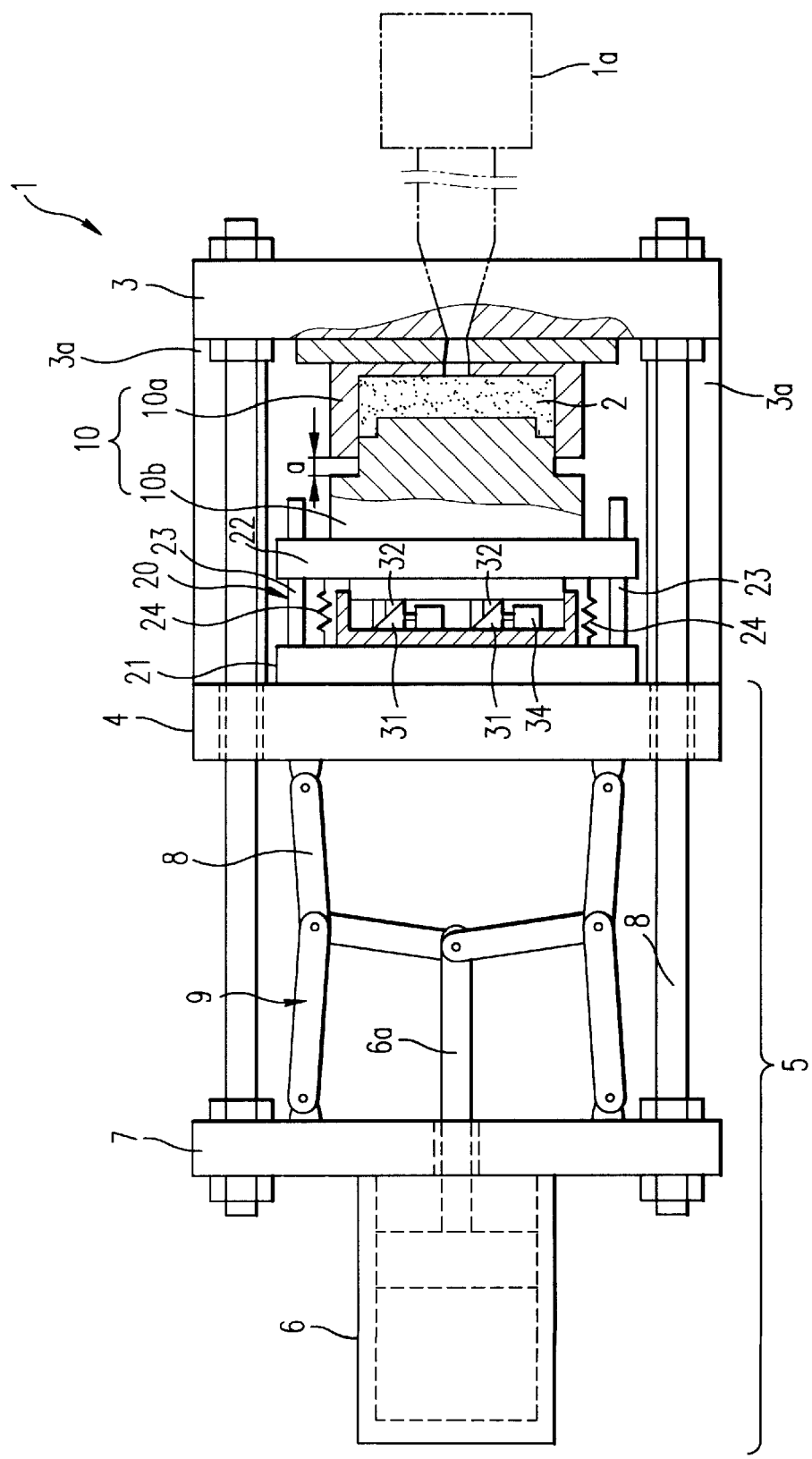
FIG. 1 is a side view showing an entire injection compression molding machine according to first and second embodiments of the present invention.

Next, embodiments of the present invention will be described with reference to the drawings. In the following description, the same members as those that have been described already are denoted by the same reference numerals, and their descriptions are omitted or simplified.

FIG. 1 shows an injection compression molding machine 1 according to first and second embodiments of the present invention. The injection compression molding machine 1 comprises a die 10, which includes a stationary mold 10A and a movable mold 10B. The die 10 is closed while a clearance a is left between the stationary mold 10A and the movable mold 10B; molten resin 2 injected from the injection apparatus 1A is charged into the interior of the die 10; and the movable mold 10B is pushed by a compression apparatus 20 disposed behind the movable mold 10B to compress the molten resin 2, to thereby perform molding.

Also, the injection compression molding machine 1 comprises a stationary die plate 3, a movable die plate 4, and a mold clamping apparatus 5. The stationary mold 10A is fixed to the stationary die plate 3. The movable mold 10B is fixed to the movable die plate 4. The mold clamping apparatus 5 advances the movable die plate 4 toward the stationary die plate 3.

The movable die plate 4 is disposed such that the movable die plate 4 is slidable along tie bars 8 which extend between a stationary plate 7 and the stationary die plate 3. A hydraulic cylinder apparatus 6 for clamping is fixed to the stationary plate 7.

The mold clamping apparatus 5 includes a toggle mechanism 9 to which the piston rod 6A of the hydraulic cylinder apparatus 6 is coupled. The pressing force of the hydraulic cylinder apparatus 6 is amplified by the toggle mechanism 9 so as to advance the movable die plate 4, to thereby clamp the die 10.

A mold clamping pressure receiving block 3A is provided between the movable die plate 4 and the stationary die plate 3. When the movable die plate 4 is advanced, the mold clamping pressure receiving block 3A abuts the movable die plate 4 in order to sustain high-pressure mold clamping force from the toggle mechanism 9. This mold clamping pressure receiving block 3A maintains the parallelism between the die plates 3 and 4.

The hydraulic cylinder apparatus 6 is of a reciprocation type which enables the piston rod 6A to advance and retreat. When the piston rod 6A is advanced, the die 10 is closed, and when the piston rod 6A is retreated, the die 10 is opened.

The above-described structure enables free setting of conditions and procedures of injection compression molding, such as temporarily opening the cavity of the die 10 during and after charging of the resin, compression subsequent to the opening, etc.

The compression apparatus 20 comprises a stationary base 21 attached to the movable die plate 4, and a movable base 22 which advances and retreats with respect to the stationary base 21.

Among these components, the movable base 22 has the movable mold 10B attached onto its front face. The movable base 22 is slidably disposed along guide bars 23 which are fixed to the stationary base 21, and is always urged toward the movable base 22 by tension springs 24 disposed between the stationary base 21 and the movable base 22.

A slant member 31 (a first slant member) and a slant member 32 (a second slant member) are provided between the stationary base 21 and movable base 22. An interlock plate is not shown in FIG. 1. Also, FIG. 1 can be considered to show the injection compression molding machine according to the second embodiment of the present invention, omitting the illustration of a synchronization mechanism.

Figure 2:
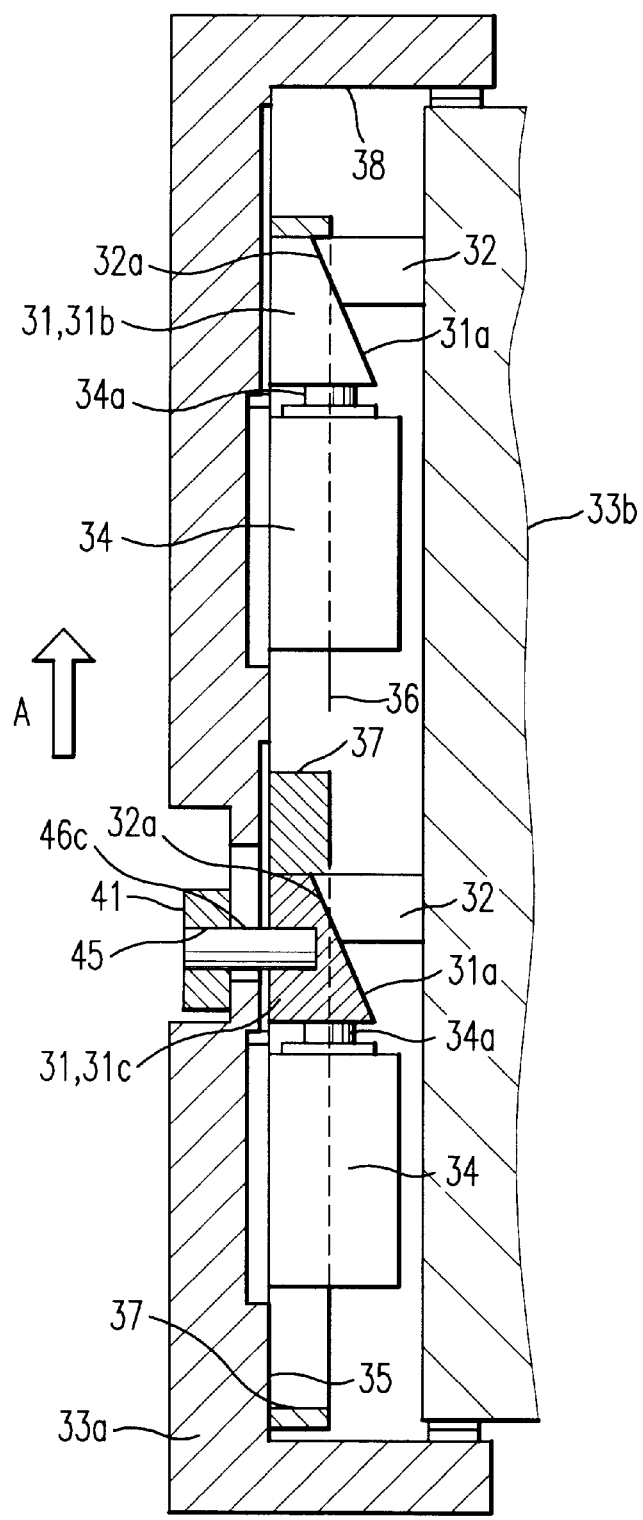
FIG. 2 is an enlarged cross-sectional view showing a state in which the compression apparatus according to the second embodiment of the present invention has not been activated.

FIG. 2 is an enlarged sectional view showing a compression apparatus, in a state before action, according to the second embodiment of the present invention. As shown in FIG. 2, the slant member 31 has a slant face 31A and is disposed in a concave member 33A, and the slant member 32 has a slant face 32A and is disposed on a convex member 33B. The slant face 31A and the slant face 32A are slanted with respect to the advancement direction of the movable mold 10B. The concave member 33A and the convex member 33B are designed to fit each other. The slant members 31 and 32 are arranged along the advancement direction of the movable mold 10 such that their respective slant faces 31A and 32A come into surface contact with each other within the space defined by the members 33A and 33B.

The slant members 31 are disposed in the box-like concave member 33A such that the slant members 31 can slide in the directions perpendicular to the advancement direction of the movable mold 10B. Each of the slant members 31 is coupled to the tip end of the piston rod 34A of a hydraulic cylinder apparatus 34 which is fixed to the concave member 33A. Each of the slant members 31 is moved toward the corresponding slant member 32 by the hydraulic cylinder apparatus 34.

Meanwhile, the slant members 32 are fixed to the plate-like convex member 33B.

In this structure, since each of the slant members 31 is made movable, the slant member 31 and the corresponding slant member 32 are movable relative to each other.

In the above-described compression apparatus 20, when the slant member 31 is advanced in the direction indicated by an arrow A in the FIG. 2 in a state in which the slant face 31A of the slant member 31 and the slant face 32A of the slant member 32 are in surface contact with each other, a pressing force for pressing the movable mold 10B toward the stationary mold 10A is generated.

The concave member 33A has a flat surface 35 which extends perpendicular to the advancement direction of the movable mold 10B. Each of the slant members 31 provided on the concave member 33A is made movable along the flat surface 35 of the concave member 33A. The angle formed by the slant face 32A and the flat surface 35 is generally 2–20°, preferably 3–15°, more preferably 4–10°. If the angle is less than 2°, the moving distance of the movable mold 10B becomes small, so that securing a sufficient moving distance may become difficult. If the angle is more than 20°, force required to move the slant member 31 may become excessively large.

Figure 3:
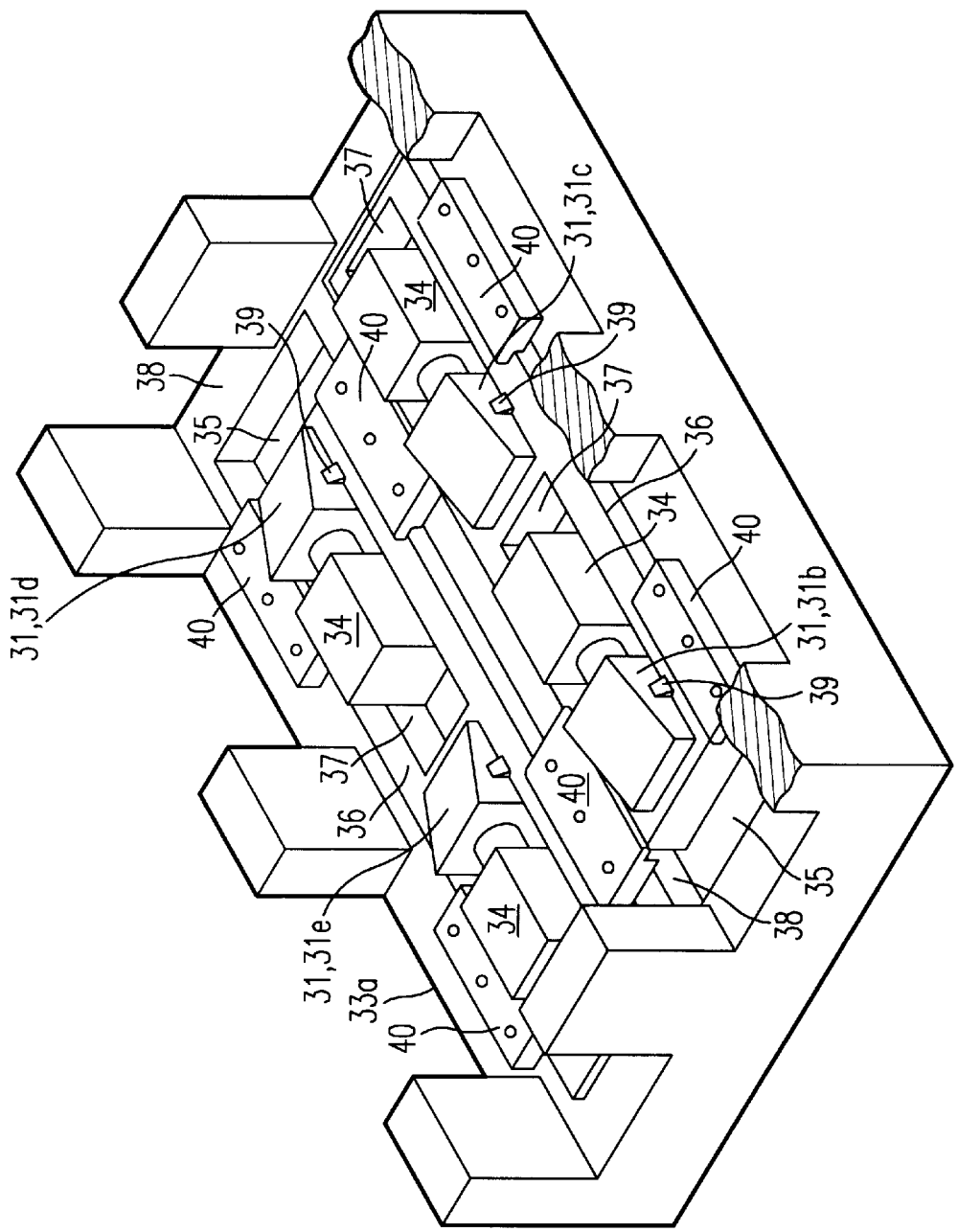
FIG. 3 is a perspective view showing the main portion of the compression apparatus according to the second embodiment.

As shown in FIG. 3, a plurality of slant members 31B, 31C, 31D, and 31E are provided on the concave member 33A.

Among these members, one group comprising the slant members 31B and 31C and the other group comprising the slant members 31D and 31E are designed to move in different directions, i.e., opposite directions. The slant members 31B and 31C are designed to move in the same direction, and the slant members 31D and 31E are designed to move in the same direction.

The slant members 31B and 31C which move in one direction are engaged with one interlock plate 36, and the slant members 31D and 31E which move in the other direction are engaged with another interlock plate 36.

Each of the interlock plates 36 is a plate-shaped rigid body in which elongated holes 37 extending along the moving directions of the slant members 31 are formed. In order to accommodate the interlock plates 36, depressed portions 38 are provided in the concave member 33A. The abovedescribed flat surface 35 serves as the bottom surfaces of the depressed portions 38. Therefore, the interlock plates 36 can slide along the flat surface 35 within the depressed portions 38.

Disposed in each of the elongated holes 37 of the interlock plate 36 are the slant member 31 and the hydraulic cylinder apparatus 34 which serves as driving means for driving the slant member 31. Of the components disposed in each elongated hole 37, the slant member 31 is fixed to the interlock plate 36 by the projecting portion 39, while the hydraulic cylinder apparatus 34 is fixed to the concave member 33A. A gap is provided between the inner surface of the elongated hole 37 of the interlock plate 36 and the hydraulic cylinder apparatus 34 so that the hydraulic cylinder apparatus 34 does not interfere with the movement of the interlock plate 36. In FIG. 3, a separate hydraulic cylinder apparatus 34 is provided for each of the slant members 31B–31E. However, provision of one hydraulic cylinder apparatus 34 for each of the interlock plates 36 is sufficient.

On the peripheral edge of each of the depressed portions 38 are provided a plurality of guide members 40 that engages the interlock plates 36 in order to guide the interlock plates 36 along the above-described moving direction.

Figure 4:
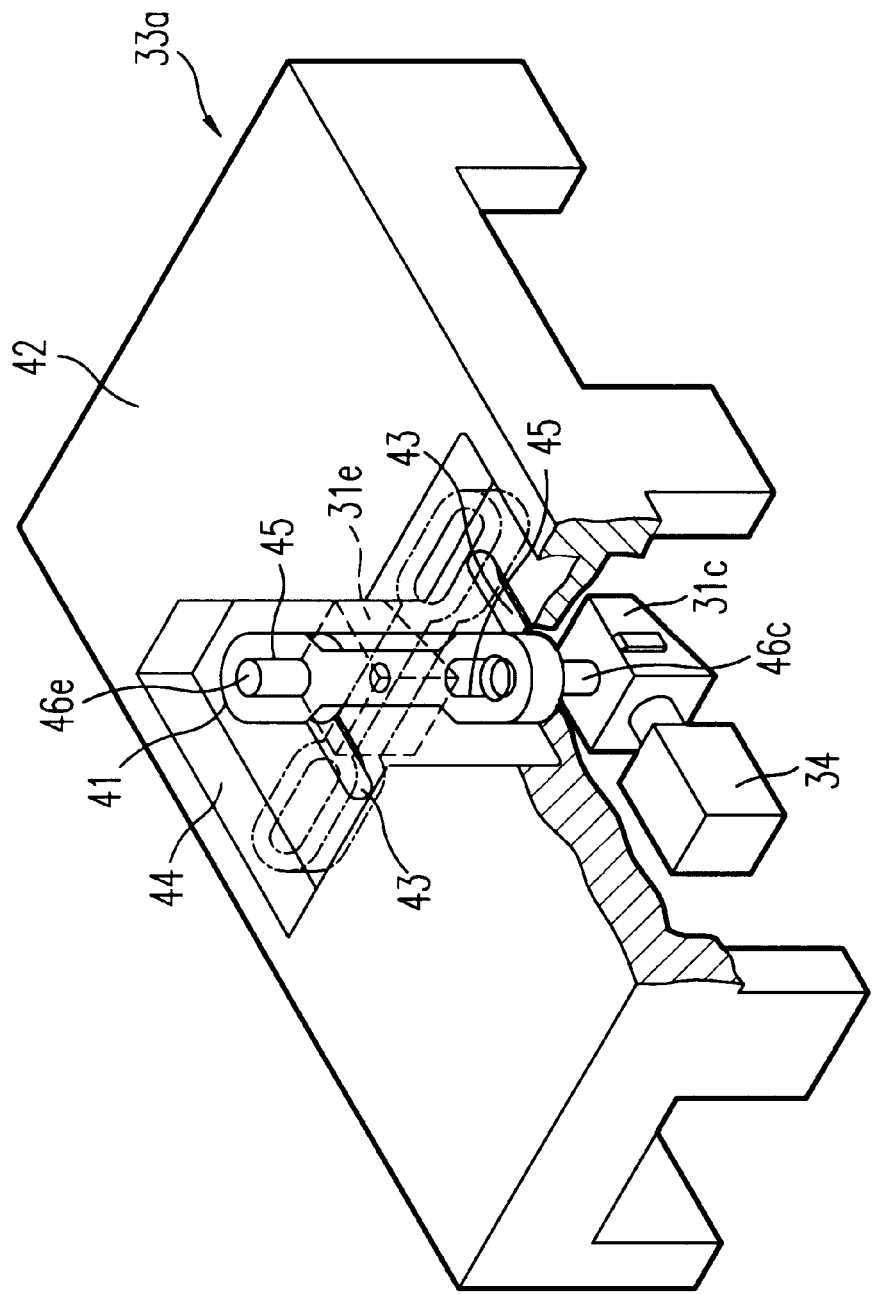
FIG. 4 is a partial cutaway perspective view showing the back of the compression apparatus shown in FIG. 3.

As shown in FIG. 4 (a partial cutaway view of the back of the apparatus shown in FIG. 3), the slant members 31C and 31E which move in opposite directions are engaged with each other through a link member 41.

That is, in the bottom portion 42 of the concave member 33A are provided elongated holes 43 each extending along the moving directions of the slant members 31C and 31E, as well as a depressed portion 44 for accommodating the link member 41.

The link member 41 is pivoted on the concave member 33A at its central portion, and can rotate in the depressed portion 44 within a predetermined angle range. An engagement portion 45 is provided at each of the opposite end portions of the link portion 41. The engagement portion 45 is an elongated hole extending radially with respect to the center of the pivot movement.

Rod-like engagement projections 46C and 46E extend from the slant members 31C and 31E, respectively, toward the bottom portion 42 of the concave member 33A. The engagement projections 46C and 46E pass through the elongated holes 43 of the concave member 33A, and reach and engage the engagement portions 45.

Through the link member 41, the slant members 31C and 31E move in a synchronized manner, so that the timing and distance of their movement become the same.

Next will be described the molding operation (molding steps) of the molding machine of the first and/or second embodiment.

First, as shown in FIG. 1, the die 10 and the compression apparatus 20 are attached to the injection compression molding machine 1. At this time, the piston rods 34A of the hydraulic cylinder apparatus 34 of the compression apparatus 20 are retracted.

When the injection compression molding machine 1 is started, the mold clamping apparatus 5 is first operated to move the movable die plate 4 toward the stationary die plate 3 to thereby close the die 10 while leaving the clearance a for the movable mold 10B to move further. The clearance a may be set within a range of, for example, 0.1–100 mm.

The mold clamping pressure receiving block 3A is provided between the movable die plate 4 and the stationary die plate 3. With this block, the die plates 3 and 4 become parallel to each other when the toggle mechanism 9 of the mold clamping apparatus 5 is fully extended, and the state of parallelism of the die plates 3 and 4 is stably maintained.

Subsequently, molten resin is injected into the die 10 from the injection nozzle of the injection apparatus 1A.

The molten resin to be injected is thermoplastic. As the thermoplastic resin, there may be used general purpose resin such as polyethylene, polypropylene, polystyrene, or ABS; engineering plastic such as polycarbonate, polyamide, or polyacetal; or any other injectable polymer material.

The compression apparatus 20 is activated after a predetermined period of time has elapsed after start of injection operation of the injection apparatus 1A, or after an injection screw provided within the injection apparatus 1A has reached a predetermined position. The activation of the compression apparatus 20 may be performed after or during charging of the resin through injection. Also, the amount of the resin charged into the die 10 may be determined arbitrarily.

Figure 5:
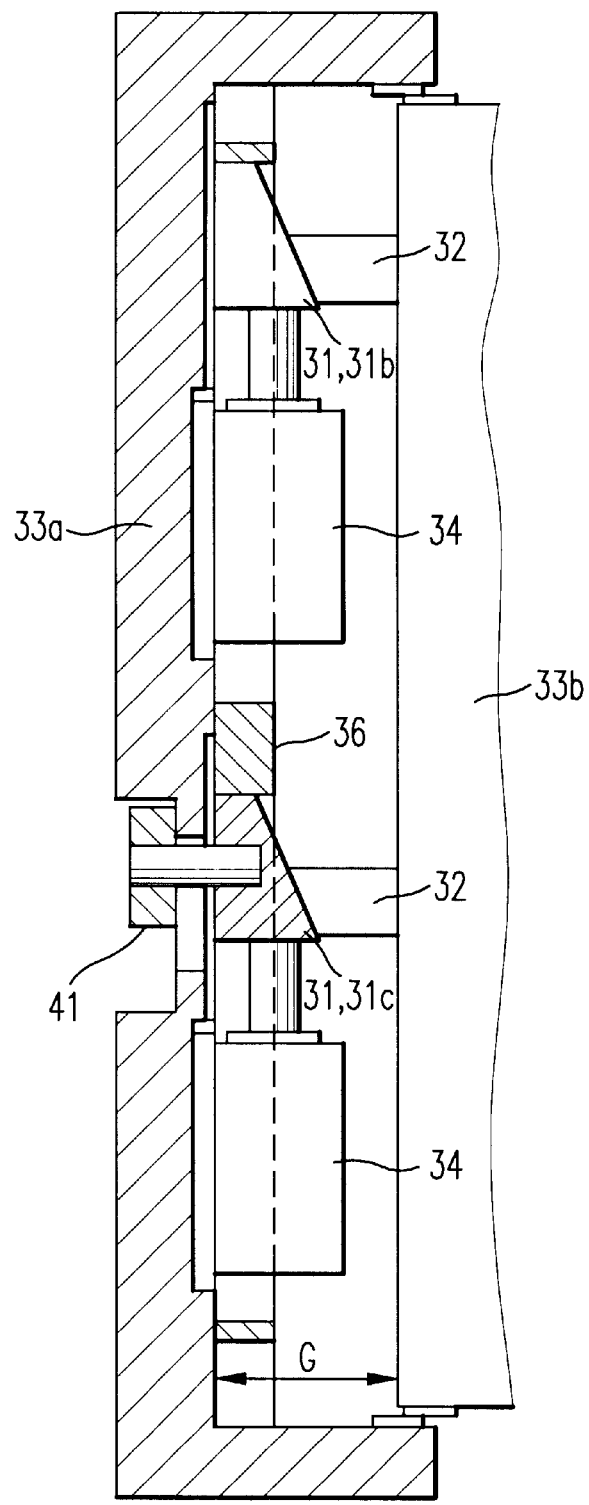
FIG. 5 is a view corresponding to FIG. 2 and showing a state in which the compression apparatus according to the second embodiment has been activated.

As a result, as shown in FIG. 5, the slant members 31 driven by the hydraulic cylinder apparatuses 34 advance toward the slant members 32, so that an internal gap G between the concave member 33A and the convex member 33B increases. With this action, the movable mold 10B is pushed toward the stationary mold 10A, so that a predetermined compression force is applied to the molten resin charged within the interior of the die 10.

In the present embodiment, there are provided a plurality of hydraulic cylinder apparatuses 34 each of which drives the corresponding slant member 31 and is individually operated. However, by virtue of the interlock plate 36 and the link member 41, the motions of all the slant members 31B-31E are synchronized with one another, and the timing and distance of their movement become the same.

With this structure, the movable mold 10B advances while constantly maintaining precise parallelism with the stationary mold 10A. As a result, a pressure applied to the molten resin within the die 10 becomes well-balanced and uniform, and the resultant molded articles accordingly attain excellent shape and dimensional precision without warpage or distortion. Further, although the stationary mold 10A and the movable mold 10B slidably engage each other so as to constitute a fitting structure, their sliding-contact portions are not damaged from abrasion.

In a state where pressure is applied to the molten resin by the compression apparatus 20, the molten resin is cooled/solidified for a predetermined period of time. When the molten resin has been sufficiently solidified after lapse of the predetermined time, the mold clamping apparatus 5 is activated so as to retreat the movable die plate 4. Concurrently, each of the hydraulic cylinder apparatuses 34 of the compression apparatus 20 is activated so as to retreat the corresponding slant member 31. As a result, the movable base 22 is retreated by the urging force of the tension spring 24. With this action, the movable mold 10B is decoupled from the stationary mold 10A so that the die 10 is brought to a mold-opened state.

Next, the mold clamping apparatus 5 is activated, the die 10 is opened, and the molded article is removed from within the die 10 so as to finish molding. Thereafter, the above-described injection compression molding operation is repeated as needed.

According to the above-described embodiments, the following effects are obtained.

In these embodiments, the slant members 31 moving in the same directions are coupled to each other via the interlock plate 36, and the slant members 31C and 31E which move in opposite directions are engaged with each other through the link member 41, which serves as a synchronization mechanism. With this structure, the movable mold 10B advances while constantly maintaining precise parallelism with respect to the stationary mold 10A. As a result, pressure applied to the molten resin within the die 10 becomes well-balanced and uniform.

Therefore, there can be produced molded articles having excellent shape and dimensional precision without causing warpage or distortion. Further, although the stationary mold 10A and the movable mold 10B slidably engage each other so as to constitute a fitting structure, damage of their sliding-contact portions from abrasion is suppressed.

In addition, the slant members 31B and 31C which move in one direction are engaged with their interlock plate 36, and the slant members 31D and 31E which move in the other direction are engaged with their interlock plate 36. Therefore, it is not necessary to engage all the slant members 31 and 32 with the synchronization mechanism in order to synchronize the slant members 31 and 32 which move in different directions. That is, it is only required to engage with the synchronization mechanism a representative of the slant members 31 and a representative of the slant members 31. Therefore, the link member 41 having a very simple structure can be used as the synchronization mechanism.

Moreover, the link member 41 is provided in combination with the interlock plate 36, and each of the elongated holes 37 provided in the interlock plate 36 accommodates a corresponding slant member 31 and a hydraulic cylinder apparatus 34 for driving the slant member 31. Therefore, the compression apparatus 20 can be remarkably downsized, and can be easily attached to the injection compression molding machine 1, while a compression force required for molding is maintained.

As a result, in the case where provision of a large number of the slant members 31 and 32 is required for molding of large molded articles, the positions of the slant members 31 and 32 can be freely set, and the structure of the synchronization mechanism can be simplified. Therefore, the weight and size of the synchronization mechanism can be reduced, and the compression apparatus does not become considerably large or heavy and can be easily attached to the injection compression molding machine 1.

Figure 6:
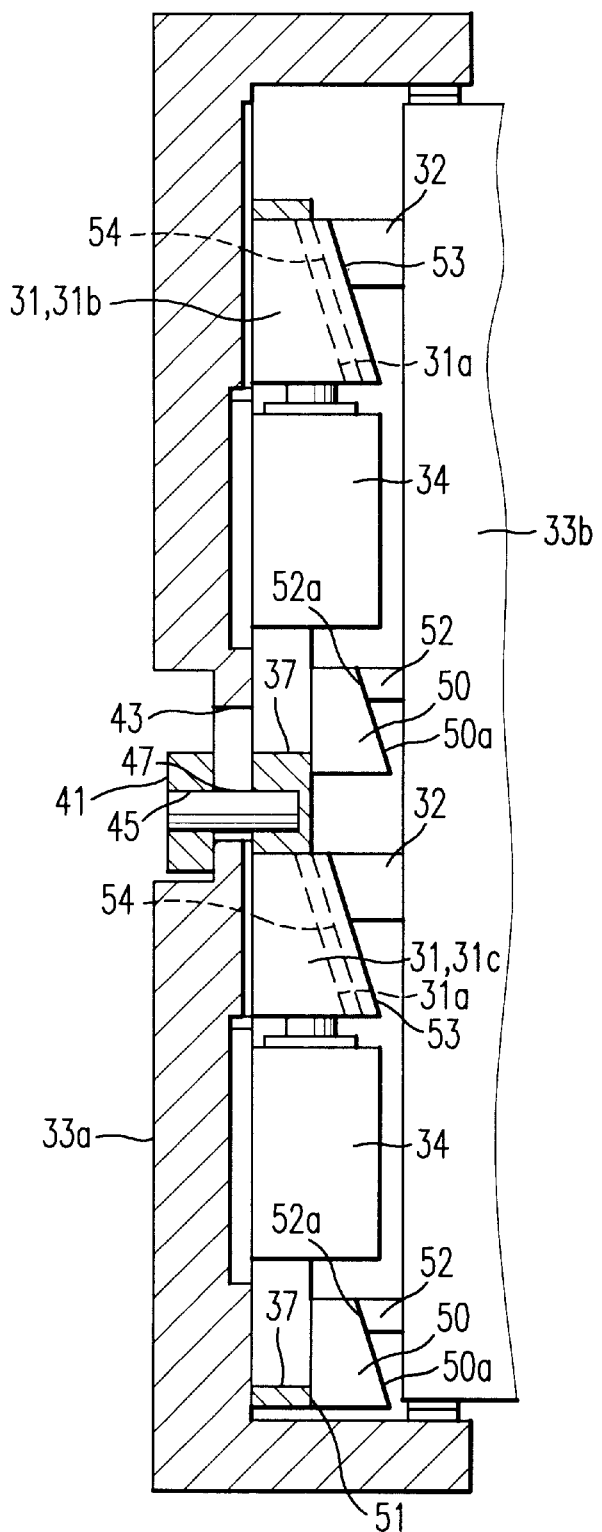
FIG. 6 is a view corresponding to FIG. 2 and showing a third embodiment of the present invention.

FIG. 6 shows a third embodiment according to the present invention. In this embodiment, an interlock plate 51 which has an auxiliary slant portion 50 projecting from the surface thereof is used instead of the flat interlock plate 36 of the above-described first and second embodiments.

The auxiliary slant portion 50 is a projection which has a slant surface 50A as in the case of the slant member 31. The auxiliary slant portion 50 projects from the surface around each of the elongated holes 37 of the interlock plate 51, and is fixed to the interlock plate 51 at a position in the rear of the hydraulic cylinder apparatus 34.

Further, while the engagement projections 46C and 46E are omitted from the engagement members 31C and 31E, respectively, each of the interlock plates 51 has the engagement projecting portion 47 (the axis at the center of the link member) which passes through the elongated hole 43 of the concave member 33A, and engages with the engagement portion 45. With this structure, slant members 31B and 31C which advance in one direction, and slant members 31D and 31E which advance in the other direction engage one another via the interlock plate 51 and the link member 41, so that their motions are synchronized.

Meanwhile, an auxiliary slant portion 52 is additionally provided in the concave member 33B which engages the convex member 33A. The auxiliary slant portion 52 has a slant face 52A in surface contact with the slant face 50A of the auxiliary slant portion 50.

Each of the slant members 31 has rising portions 53 such that the rising portions extend along the opposite edges thereof. A groove 54 extending along the slant surface 30A is provided in each of the opposite side surfaces of the rising portions 53.

Each of the slant members 32 has a pair of projections (unillustrated) which engage the grooves 54 of each slant member 31. These projections constantly maintain a state where the slant members 31 and 32 contact each other.

In this embodiment, the movable base 22 not only advances when the slant member 31 advances, but also retreats when the slant member 31 retreats. Therefore, the tension springs 24 employed in the above-described first and second embodiments are omitted.

The groove 54 usually has a T-shaped cross-section. Preferably, the width of the T-shaped groove is about 60% to 80% the width of the slant member 31. In this case, when the slant member 31 is retreated, the slant member 31 comes into contact with the slant member 32 through an area corresponding to about 20% of the width of the slant member The above-described embodiment provides the same action and effects as do the first and second embodiments. Further, since the auxiliary slant portions 50 and 52 are additionally provided therein, the contact area becomes larger, and the motion of the compression apparatus 20 becomes smoother, resulting in an additional effect which improves uniformity of the compression force applied to the molten resin charged into the die 10.

The first, second, and third embodiments of the present invention have been described as above. However, the present invention should not be construed as being limited to these embodiments. Various modifications and changes of the design are possible within the scope of the present invention.

For example, the compression force applied to the resin which has been charged into the die is not limited to that generated through moving of the entirety of the movable mold of the die. Alternatively, the compression force may be generated as follows: a portion of the movable mold corresponding to the mold cavity is made movable, and only that portion is moved; or a portion of the die other than the movable mold, such as a portion of the stationary mold corresponding to the mold cavity, is made movable, and only that portion is moved.

Also, the above-described embodiments use the compression apparatus in which only the first slant portions are movably provided. However, the present invention is not limited thereto, and there may be used a compression apparatus in which only the second slant portions are movably provided, or in which both the first and second slant portions are movably provided. In other words, there may be used any compression apparatus in which the first and second slant portions move relatively to each other so as to generate pushing force for pushing the movable mold toward the stationary mold.

The interlock plate is not limited to a plate in which a plurality of slant portions are provided in series, and may be a plate in which they are provided in parallel, or in which they are provided in matrix.

Figure 7A:
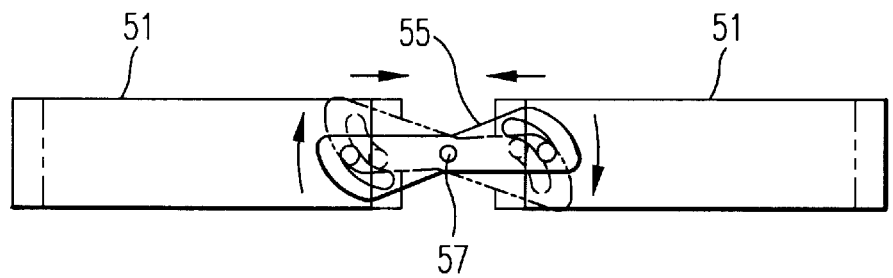
FIGS. 7A and 7B are schematic views showing a modification of the present invention.
Figure 7B:
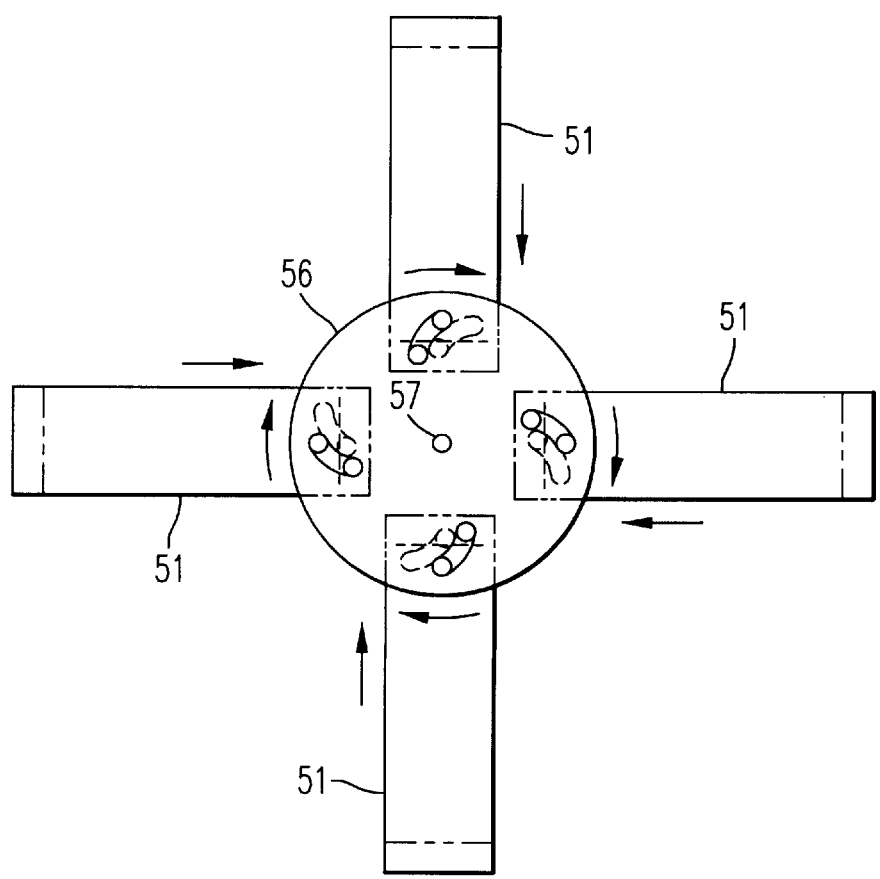

Also, the arrangement of the interlock plates is not limited to an arrangement in which they are arranged in parallel with respect to the moving directions of the slant portions, and may be an arrangement in which a plurality of interlock plates 51 are arranged in series (FIG. 7(A)), or in which they are arranged radially (FIG. 7(B)).

In the case where the interlock plates 51 are arranged in series or radially, the following structure may be employed. An elongated hole 58 which extends diagonally with respect to the radial direction of a pivot axis 57 is provided in each of pivotable link members 55 and 56. An engagement projecting portion 46 is provided in each of the interlock plates 51, and is engaged with each of the elongated holes 58 of the link members 55 and 56, to thereby link all the interlock plates 51 and synchronize their motions.

The synchronization mechanism is not limited to a link, and may be a mechanism which comprises a timing belt, a chain, or a gear. However, when a link is employed in any of the above-described embodiments, the compression apparatus can be considerably simplified.

The molding machine to which the compression apparatus is attached is not limited to an injection molding machine, and may be a press molding machine. In other words, there may be used any molding machine in which a movable mold is advanced toward a stationary mold so as to apply compression force to molten resin, thereby performing molding.

The present invention can be applied not only to an ordinary injection compression molding method, but also to a molding method in which a face material is previously disposed in a die, and a molten resin is injected into the die, to thereby obtain a layered molded article; a molding method in which a foaming agent is previously incorporated into a molten resin to be injected, to thereby obtain a foamed article; or a molding method in which gas is injected into a molten resin charged into a die, to thereby obtain a molded article having a cavity, so long as the molding method comprises a step of applying compression force to the resin.

Figure 8:
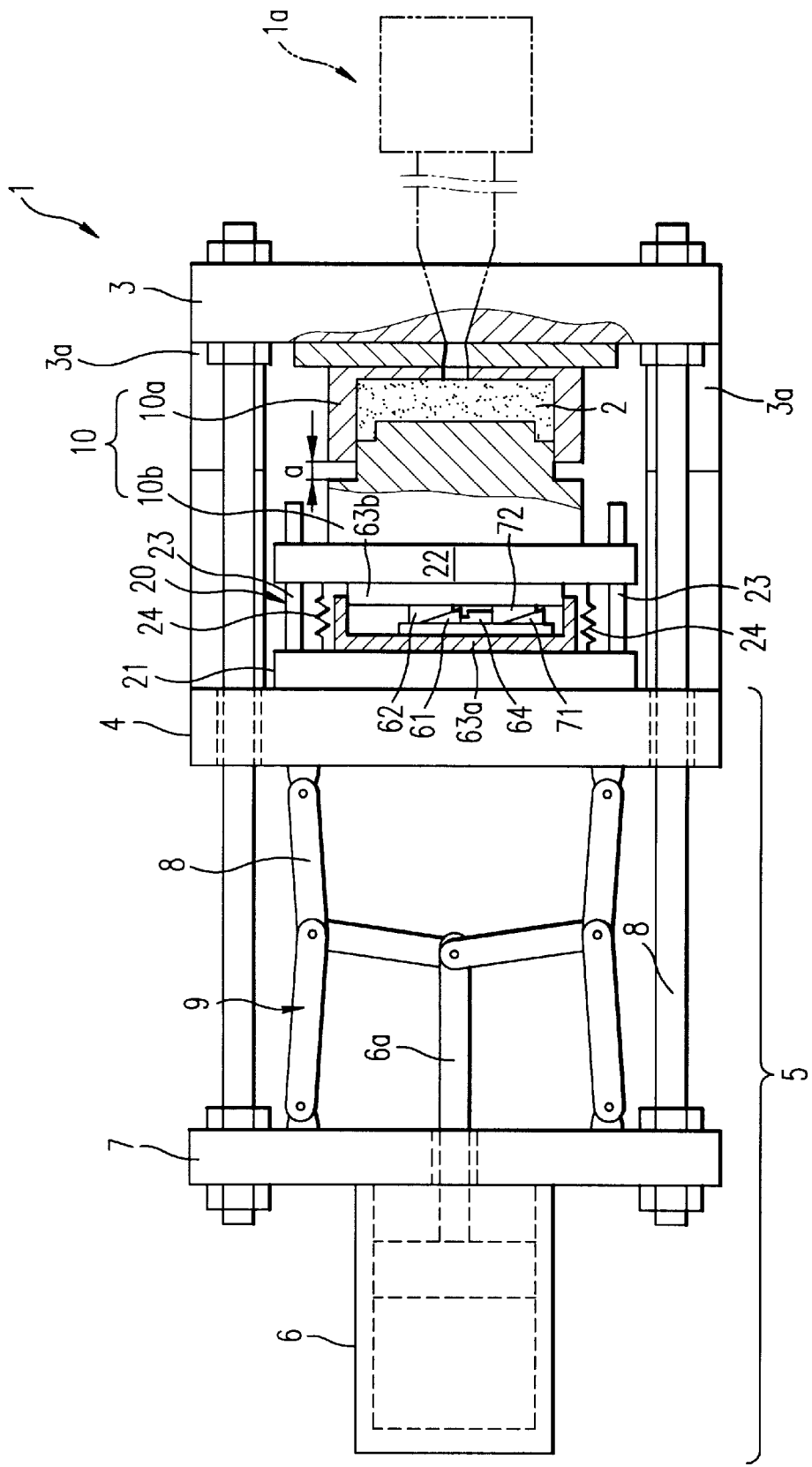
FIG. 8 is a side view showing an entire injection compression molding machine according to a fourth embodiment of the present invention.

The compression apparatus is activated by means of the hydraulic cylinder apparatuses not only for compression, but also for increase/decrease of the gap in the cavity during molding as appropriate in the process of compression. FIG. 8 shows the injection compression molding machine 1 according to a fourth embodiment of the present invention. In FIG. 8, portions other than the portion surrounded by the stationary base 21 and the movable base 22 have the same structures and functions as in the case of the machine of FIG. 1. Therefore, repeated description of such structures and functions is omitted.

Figure 9:
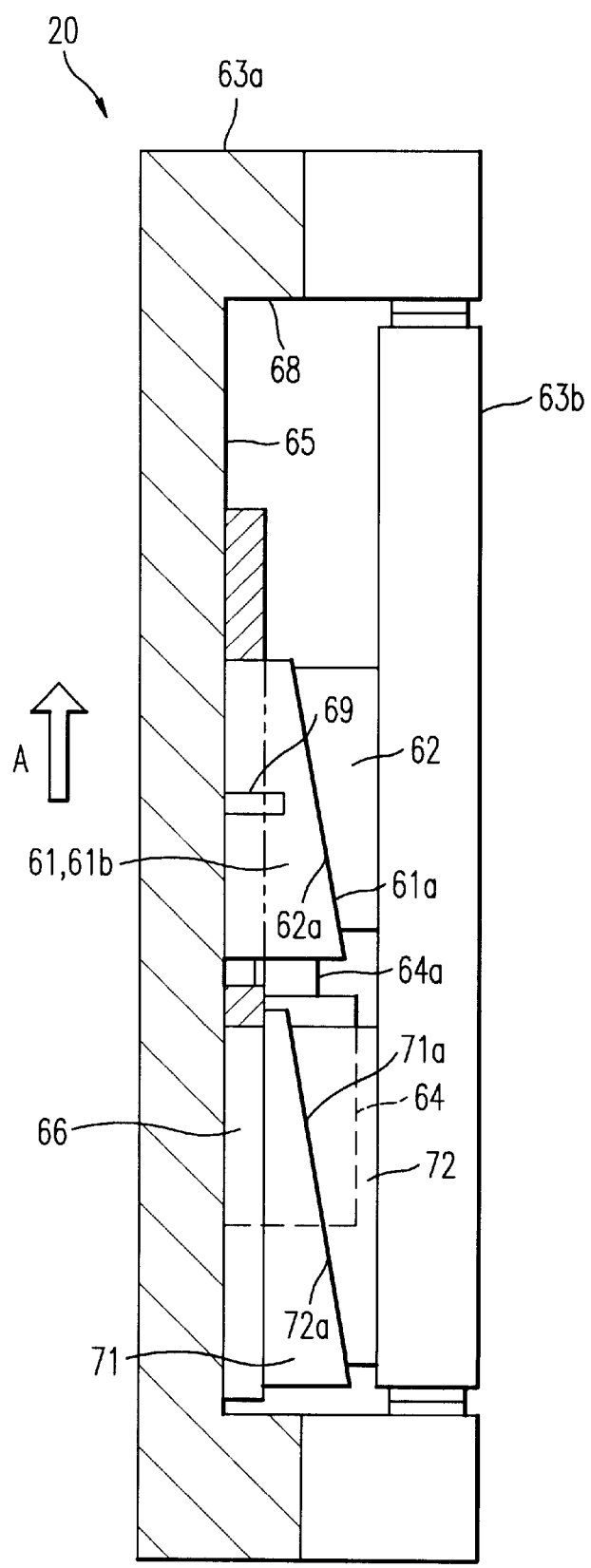
FIG. 9 is an enlarged cross-sectional view showing a state in which the compression apparatus according to the fourth embodiment has not been activated.

In FIG. 8, slant members 61 (first slant portions) and slant members 62 (second slant portions) are provided between the stationary base 21 and the movable base 22. As shown in FIG. 9, the slant member 61 has a slant face 61A and is disposed in a concave member 63A, and the slant member 62 has a slant face 62A and is disposed on a convex member 63B. The slant face 61A and the slant face 62A are slanted with respect to the advancement direction of the movable mold 10B. The concave member 63A and the convex member 63B are designed to fit each other. The slant members 61 and 62 are arranged along the advancement direction of the movable mold 10 such that their respective slant faces 61A and 62A come into surface contact with each other within the space defined by the members 63A and 63B.

The slant members 61 are disposed in the box-like concave member 63A such that the slant members 61 can slide in the directions perpendicular to the advancement direction of the movable mold 10B. Each of the slant members 61 is coupled to the tip end of the piston rod 64A of a hydraulic cylinder apparatus 64 which is fixed to the concave member 63A. Each of the slant members 61 is moved toward the corresponding slant member 62 by the hydraulic cylinder apparatus 64.

Meanwhile, the slant members 62 are fixed to the plate-like convex member 63B.

In this structure, since each of the slant members 61 is made movable, the slant member 61 and the corresponding slant member 62 are movable relative to each other.

In the above-described compression apparatus 20, when the slant member 61 is advanced in the direction indicated by an arrow A in the drawing in a state in which the slant face 61A of the slant member 61 and the slant face 62A of the slant member 62 are in surface contact with each other, a pressing force for pressing the movable mold 10B toward the stationary mold 10A is generated.

The concave member 63A has a flat surface 65 which extends perpendicular to the advancement direction of the movable mold 10B. Each of the slant members 61 provided on the concave member 63A is made movable along the flat surface 65 of the concave member 63A.

Figure 10:
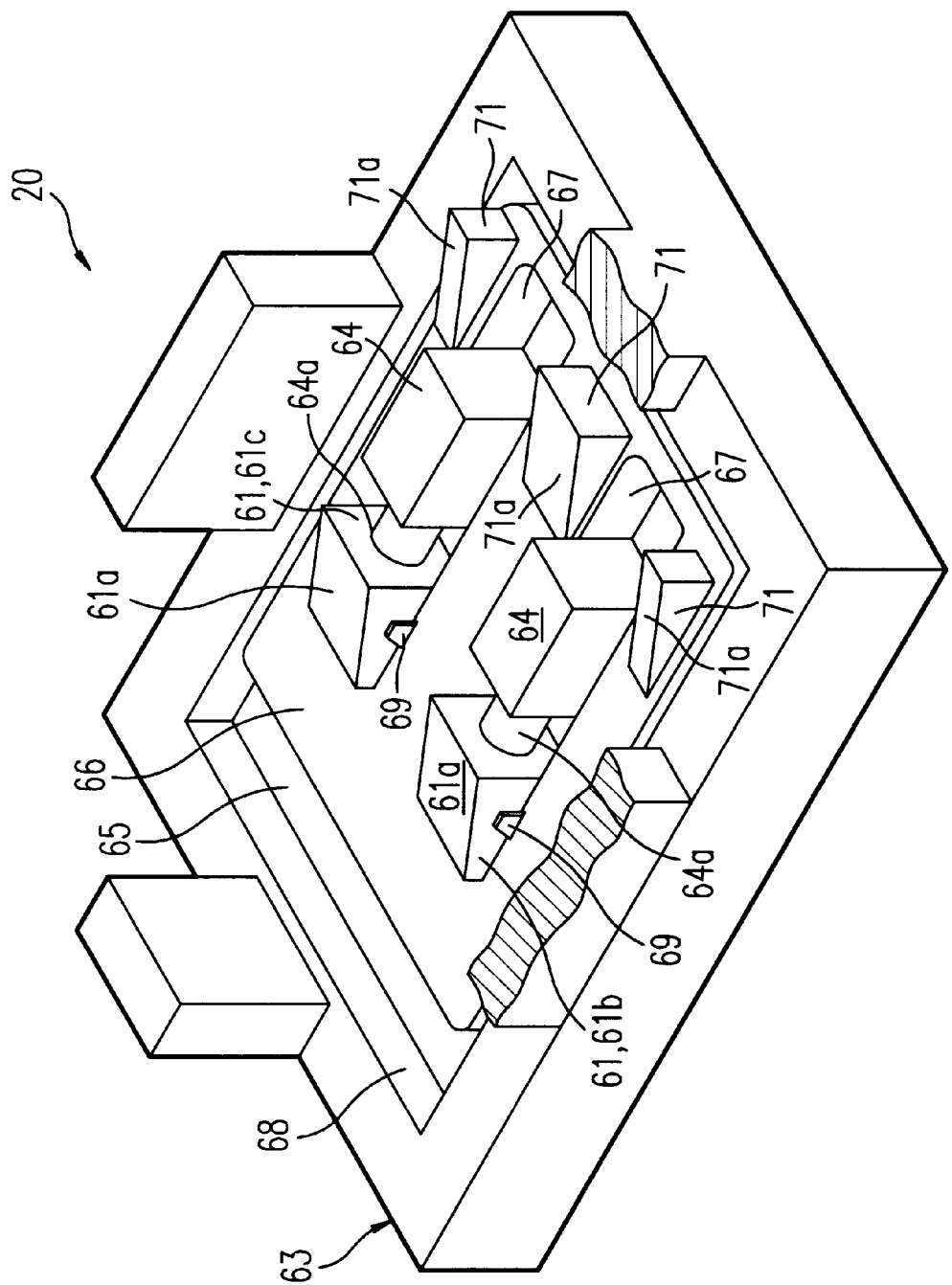
FIG. 10 is a perspective view showing the main portion of the compression apparatus according to the fourth embodiment.

As shown in FIG. 10, a plurality of slant members 61B and 61C are provided on the concave member 63A. These slant members 61B and 61C move in the same direction and engaged with a common interlock plate 66.

The interlock plate 66 is a plate-shaped rigid body in which elongated holes 67 extending along the moving directions of the slant members 61 are formed. In order to accommodate the interlock plate 66, a depressed portion 68 is provided in the concave member 63A. The above-described flat surface 65 serves as the bottom surface of the depressed portion 68. Therefore, the interlock plate 66 can slide along the flat surface 65 within the depressed portion 68.

Disposed in each the elongated holes 67 of the interlock plate 66 are the slant member 61 and the hydraulic cylinder apparatus 64 which serves as driving means for driving the slant member 61. Of the components disposed in each elongated hole 67, the slant member 61 is fixed to the interlock plate 66 by the projecting portion 69, while the hydraulic cylinder apparatus 64 is fixed to the concave member 63A. A gap is provided between the inner surface of the elongated hole 67 of the interlock plate 66 and the hydraulic cylinder apparatus 64 so that the hydraulic cylinder apparatus 64 does not interfere with the movement of the interlock plate 66.

On the peripheral edge of the depressed portion 38 are provided a plurality of guide members (no shown) that engages the interlock plate 66 in order to guide the interlock plate 66 along the above-described moving direction.

First slant members 71, which serve as first auxiliary slant portions and correspond to the slant members 61 serving as the first slant portions, are fixed to the interlock plate 66 at positions spaced away from the slant members 61 along the moving direction of the slant portions 61.

Referring back to FIG. 9, second slant members 72 serving as second auxiliary slant portions are fixed to the convex member 63B facing the interlock plate 66 at positions corresponding to the slant member 71. These auxiliary slant members 71 and 72 have slant faces 71A and 72A slanted with respect to the advancement direction of the movable mold 10B. The auxiliary slant members 71 and 72 are arranged along the advancement direction of the movable mold 10B, and the slant faces 71A and 72A of the first and second auxiliary slant members 71 and 72 are in surface contact with each other.

Each of the slant faces 71A and 72A of the first and second auxiliary slant members 71 and 72 has the same angle of inclination as that of the slant faces 61A and 62A of the slant members 61 and 62.

Next will be described the molding operation (molding steps) of the molding machine of the present embodiment. The molding operation from attachment of a die to start of injection is the same as that described above, and the kind of injected molten resin is also the same as that described above.

The compression apparatus 20 is activated after a predetermined period of time has elapsed after start of injection operation of the injection apparatus 1A, or after an injection screw provided within the injection apparatus 1A has reached a predetermined position. The activation of the compression apparatus 20 may be performed after or during charging of the resin through injection. Also, the amount of the resin charged into the die 10 may be determined arbitrarily.

Figure 11:
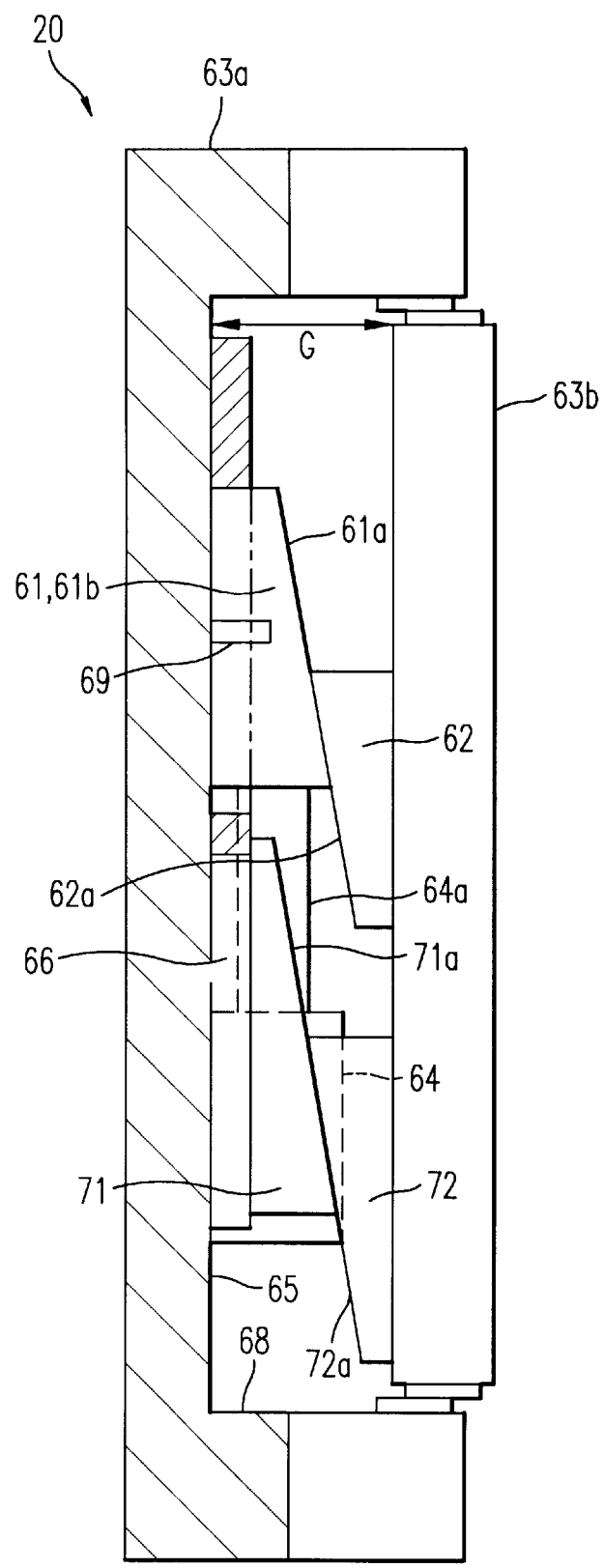
FIG. 11 is a view corresponding to FIG. 9 and showing a state in which the compression apparatus according to the fourth embodiment has been activated.

As a result, as shown in FIG. 11, the slant members 61 driven by the hydraulic cylinder apparatuses 64 advance toward the slant members 62, so that an internal gap G between the concave member 63A and the convex member 63B increases. With this action, the movable mold 10B is pushed toward the stationary mold 10A, so that a predetermined compression force is applied to the molten resin charged within the interior of the die 10.

In the present embodiment, there are provided a plurality of hydraulic cylinder apparatuses 64 each of which drives the corresponding slant member 61 and is individually operated. However, by virtue of the interlock plate 66, the motions of the slant members 61B and 61C are synchronized with each other, and the timing and distance of their movement become the same.

Further, since the auxiliary slant members 71 and 72, which are in surface contact with each other as in the case of the slant members 61 and 62, are disposed at positions spaced away from the slant members 61 along the moving direction of the slant portions 61, and among them, the auxiliary slant members 71 are fixed to the interlock plate 66, the auxiliary slant members 71 move together with the slant member 61, so that the auxiliary slant members 71 push the movable mold 10B via the auxiliary slant members 72. As a result, the movable mold 10B is pushed at a plurality of dispersed positions.

Therefore, when the movable mold 10B is advanced, unbiased and well-balanced pressing force is applied to the movable mold 10B, so that the movable mold 10B advances while constantly maintaining precise parallelism with respect to the stationary mold 10A.

As a result, a pressure applied to the molten resin within the die 10 becomes well-balanced and uniform, and the resultant molded articles accordingly attain excellent shape and dimensional precision without warpage or distortion. Further, although the stationary mold 10A and the movable mold 10B slidably engage each other so as to constitute a fitting structure, their sliding-contact portions are not damaged from abrasion.

In a state where pressure is applied to the molten resin by the compression apparatus 20, the molten resin is cooled/solidified for a predetermined period of time. When the molten resin has been sufficiently solidified after lapse of the predetermined time, the mold clamping apparatus 5 is activated so as to retreat the movable die plate 4. Concurrently, each of the hydraulic cylinder apparatuses 64 of the compression apparatus 20 is activated so as to retreat the slant members 61 and the auxiliary slant members 71. As a result, the movable base 22 is retreated by the urging force of the tension spring 24. With this action, a clearance a for clamping operation is secured between the movable mold 10B and the stationary mold 10A.

Next, the mold clamping apparatus 5 is activated, the die 10 is opened, and the molded article is removed from within the die 10 so as to finish molding. Thereafter, the above-described injection compression molding operation is repeated as needed.

According to the above-described embodiment, the following effects are obtained.

That is, since the auxiliary slant members 71 and 72 are disposed at positions spaced away from the slant members 61 and 62 along the moving direction of the slant members 61, and among them, the auxiliary slant members 71 are fixed to the interlock plate 66 engaged with the slant members 61 such that the auxiliary slant members 71 move together with the slant members 61, the movable mold 10B is pushed at a plurality of dispersed positions. Therefore, even when the slant members 61 and 62 are disposed at biased positions with respect to the movable mold 10B, when the movable mold 10B is advanced, unbiased and well-balanced pressing force is applied to the movable mold 1B, so that the movable mold 10B advances while maintaining the parallelism with respect to the stationary mold 10A.

Accordingly, even when the slant members 61 and 62 are disposed at biased positions with respect to the movable mold 10B, the movable mold 10B can be advanced, while the parallelism with respect to the stationary mold 10A is maintained. Therefore, no problem occurs even when the sizes of the slant members 61 and the hydraulic cylinders 64 for driving the slant members 61 relative to the size of the compression apparatus 20 increase due to reduction in the overall size of the compression apparatus 20. Accordingly, the size of the compression apparatus 20 can be decreased in order to facilitate attachment to the injection compression molding machine 1.

Further, since the size of the compression apparatus 20 is decreased, the compression apparatus 20 enables operation of pressing a portion of the movable mold such as a movable core.

In addition, when the movable mold 10B is advanced, well-balanced pressing force is applied to the movable mold 10B by the compression apparatus 20, so that the parallelism between the stationary mold 10A and the movable mold 10B is maintained. Therefore, the pressure applied to the molten resin becomes and uniform, so that molded articles having excellent shape and dimensional precision can be manufactured without causing warpage or distortion. Further, although the stationary mold 10A and the movable mold 10B slidably engage each other so as to constitute a fitting structure, their sliding-contact portions are not damaged from abrasion.

Figure 12:
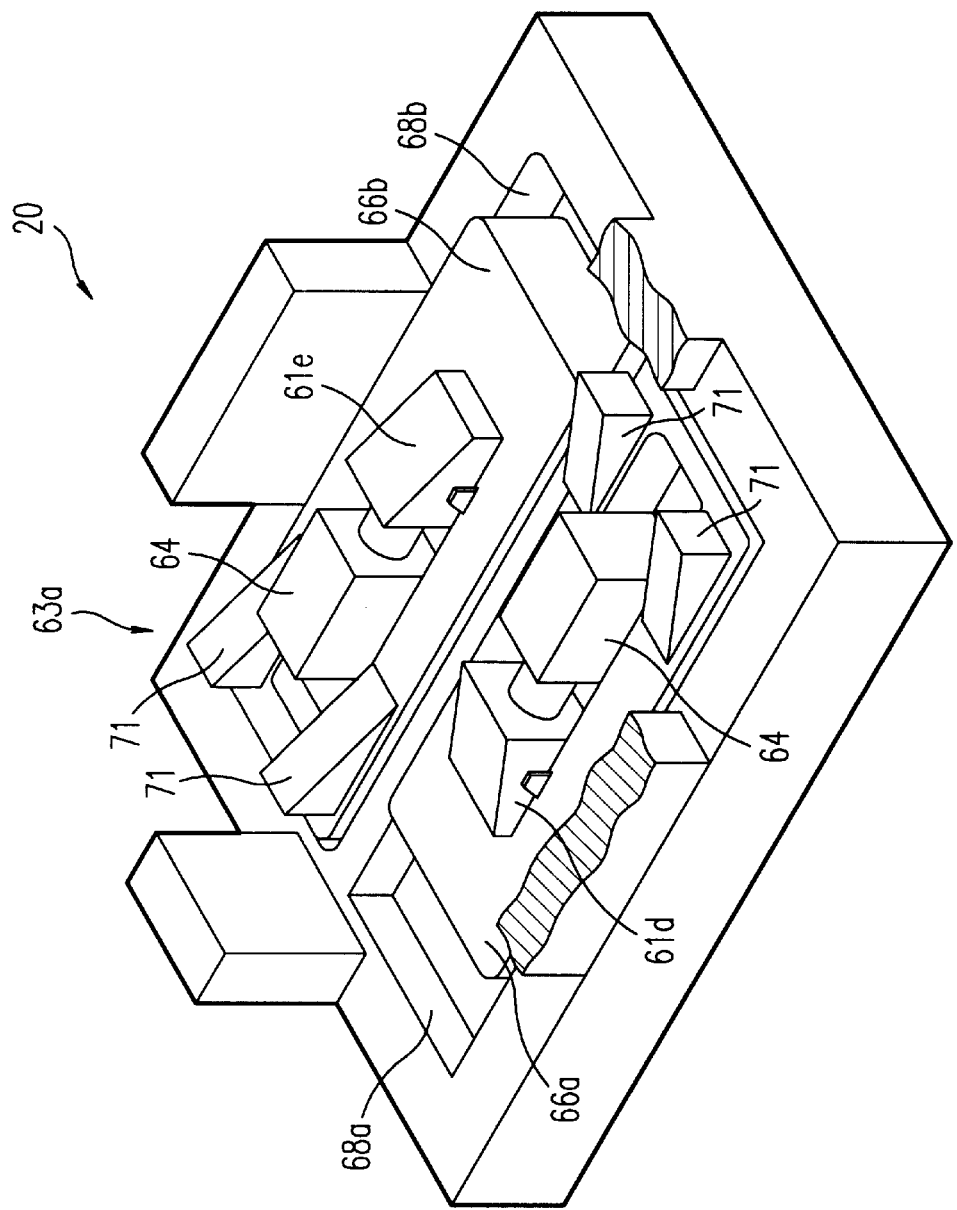
FIG. 12 is a view corresponding to FIG. 10 and showing a fifth embodiment of the present invention.

FIG. 12 shows a fifth embodiment of the present invention. In the present invention, in place of the slant members 61B and 61C which are used in the fourth embodiment and which are movable in the same direction, slant members 61D and 61E which are movable in opposite directions are used.

That is, two depressed portions 68A and 68B are provided in the concave member 63A, and interlock plates 66A and 66B are respectively provided within the depressed portions 68A and 68B.

As in the case of the interlock plate 66, each of the interlock plates 66A and 66B has auxiliary slant members 71. Of the interlock plates 66A and 66B, the interlock plate 66A is engaged with the slant member 61D so as to move together with the slant member 61D. Meanwhile, the interlock plate 66B is engaged with the slant member 61E so as to move together with the slant member 61E.

Figure 13:
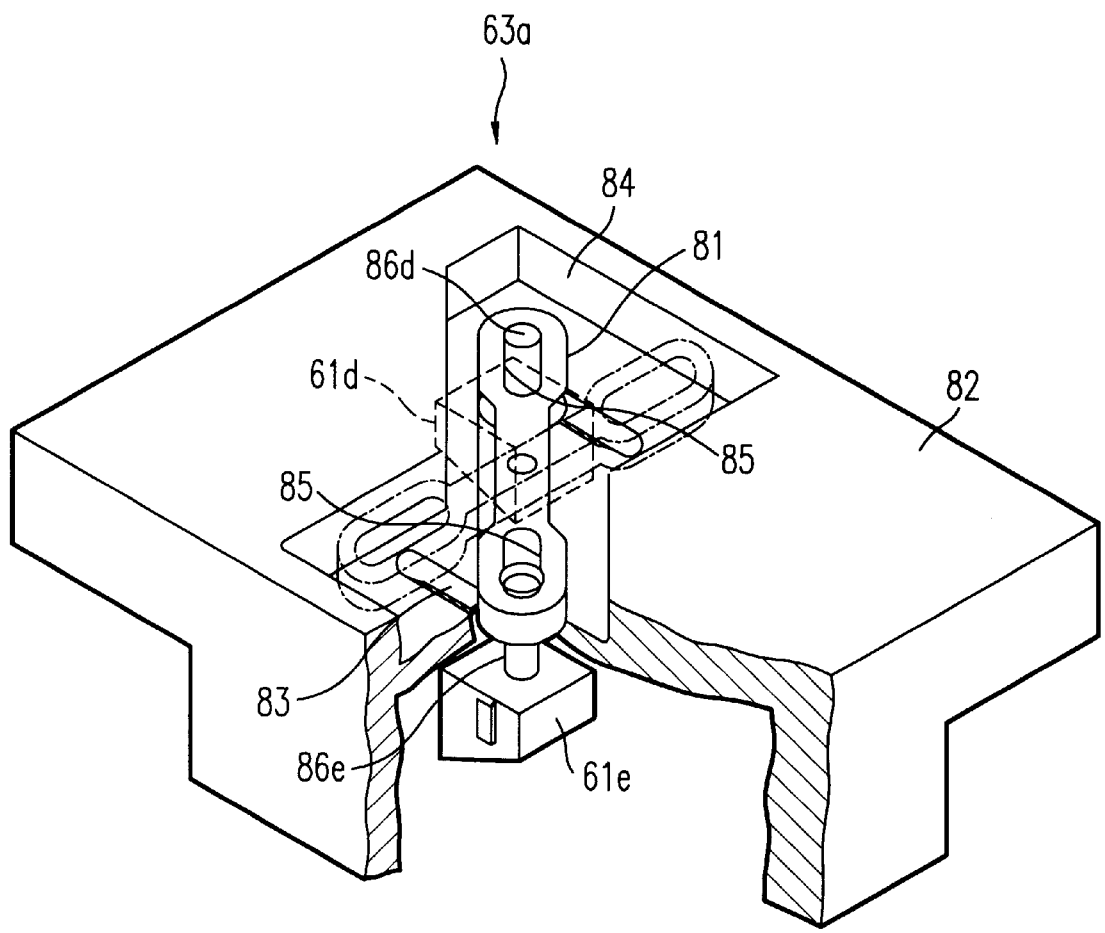
FIG. 13 is a partial cutaway perspective view showing the back of the compression apparatus shown in FIG. 12.

As shown in FIG. 13 (a partial cutaway view of the back of the apparatus shown in FIG. 10), the slant members 61D and 61E which move in opposite directions are engaged with each other through a link member 81, which constitutes a synchronization mechanism.

Specifically, in the bottom portion 82 of the concave member 63A are provided elongated holes 83 each extending along the moving directions of the slant members 61D and 61E, as well as a depressed portion 84 for accommodating the link member 81.

The link member 81 is pivoted on the concave member 63A at its central portion, and can rotate in the depressed portion 84 within a predetermined angle range. An engagement portion 85 is provided at each of the opposite end portions of the link portion 81. The engagement portion 85 is an elongated hole extending radially with respect to the center of the pivot movement.

Rod-like engagement projections 86D and 86E extend from the slant members 61D and 61E, respectively, toward the bottom portion 82 of the concave member 63A. The engagement projections 86D and 86E pass through the elongated holes 83 of the concave member 63A, and reach and engage the engagement portions 85.

Through the link member 81, the slant members 61D and 61E move in a synchronized manner, so that the timing and distance of their movement become the same.

Although not shown in the drawings, slant members 62D, 62E, and 72 are provided on the convex member 63B at respective positions corresponding to the positions of the slant members 61D and 61E and the auxiliary slant members 71 provided on the concave member 63A. The slant members 62D, 62E, and 72 have slant faces corresponding to the faces of the slant members 61D, 61E, and 71.

The present embodiment provides action and effects similar to those of the fourth embodiment. In addition, the present invention provides the following effect.

That is, when the movable mold 10B is advanced through movement of the slant members 61D and 61E, a force is applied to the movable mold 10B in a direction perpendicular to the advancement direction of the movable mold 10B. However, since the slant members 61D and 61E move in opposite directions, the force becomes small considerably, compared with the case where the slant members move in the same direction.

Therefore, the required rigidity of the guide bars 23, which slidably support the stationary base 21 carrying the convex member 63B of the compression apparatus 20 decreases, so that the weight of members constituting the guide bars 23 and the like can be decreased in order to further decrease the weight of the compression apparatus 20.

Figure 14:
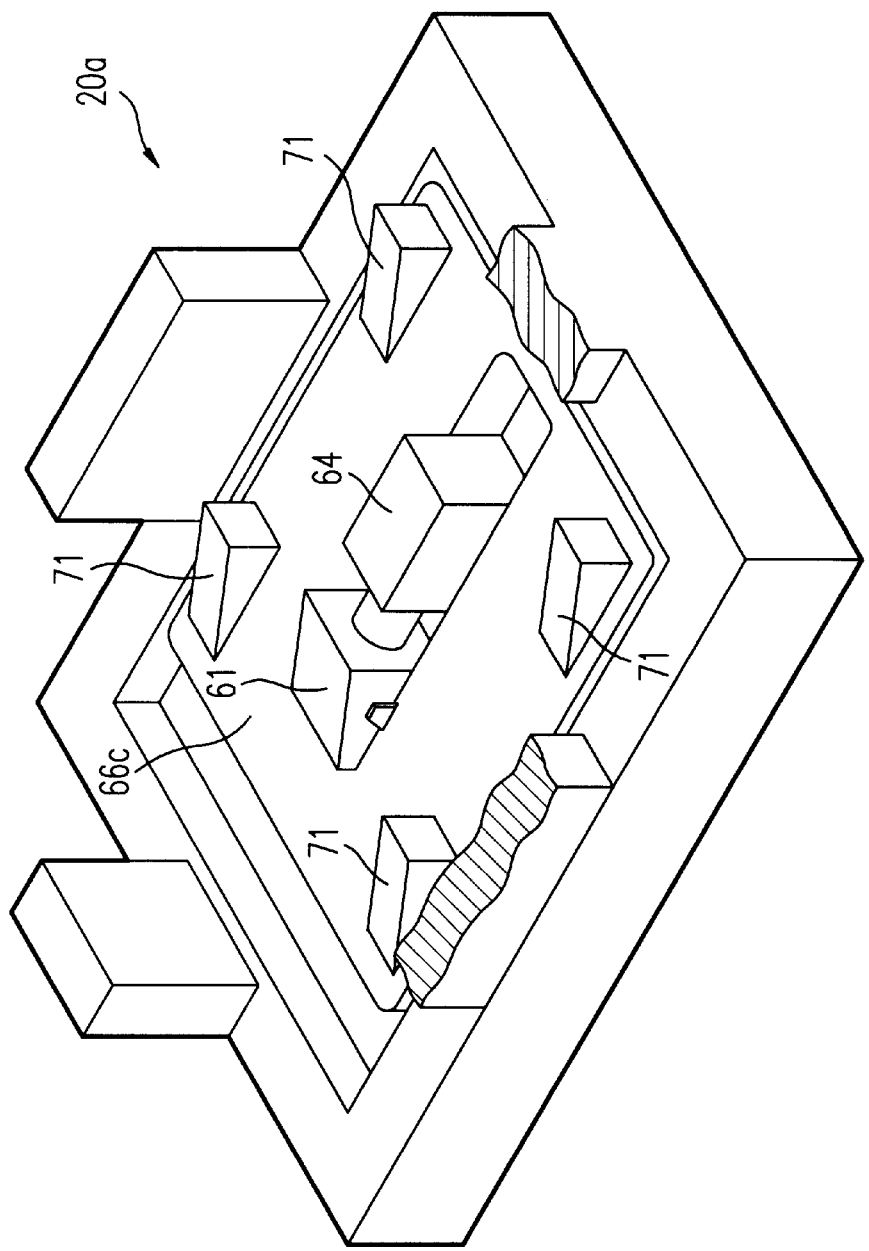
FIG. 14 is a view corresponding to FIG. 10 and showing a sixth embodiment of the present invention.
Figure 15:
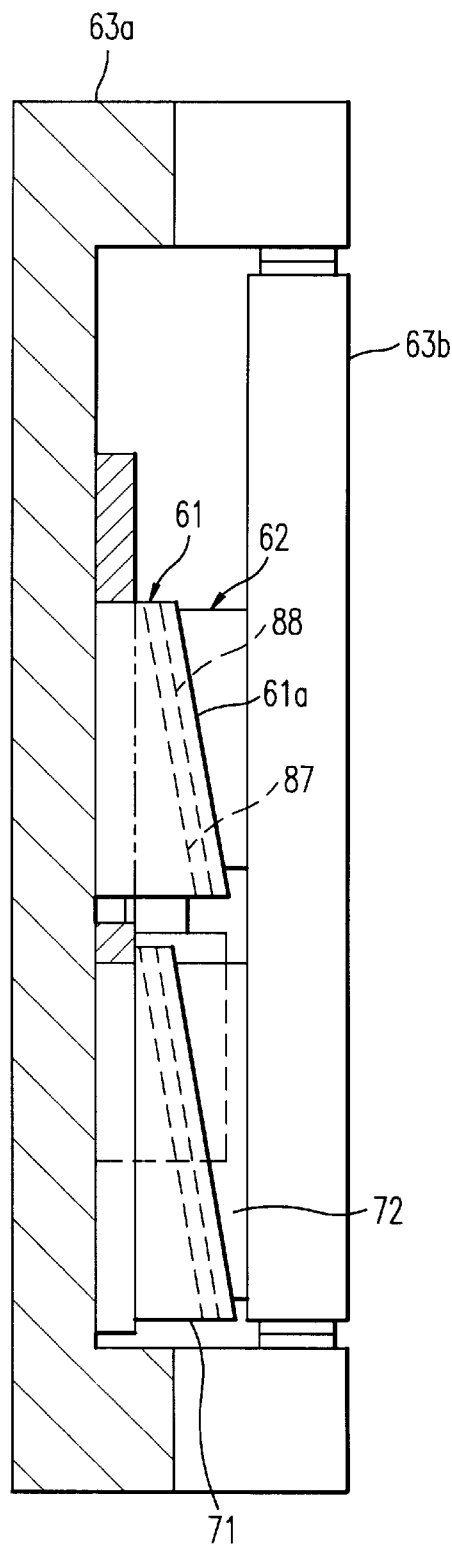
FIG. 15 is a schematic view showing a modification of the present invention.
Figure 16:
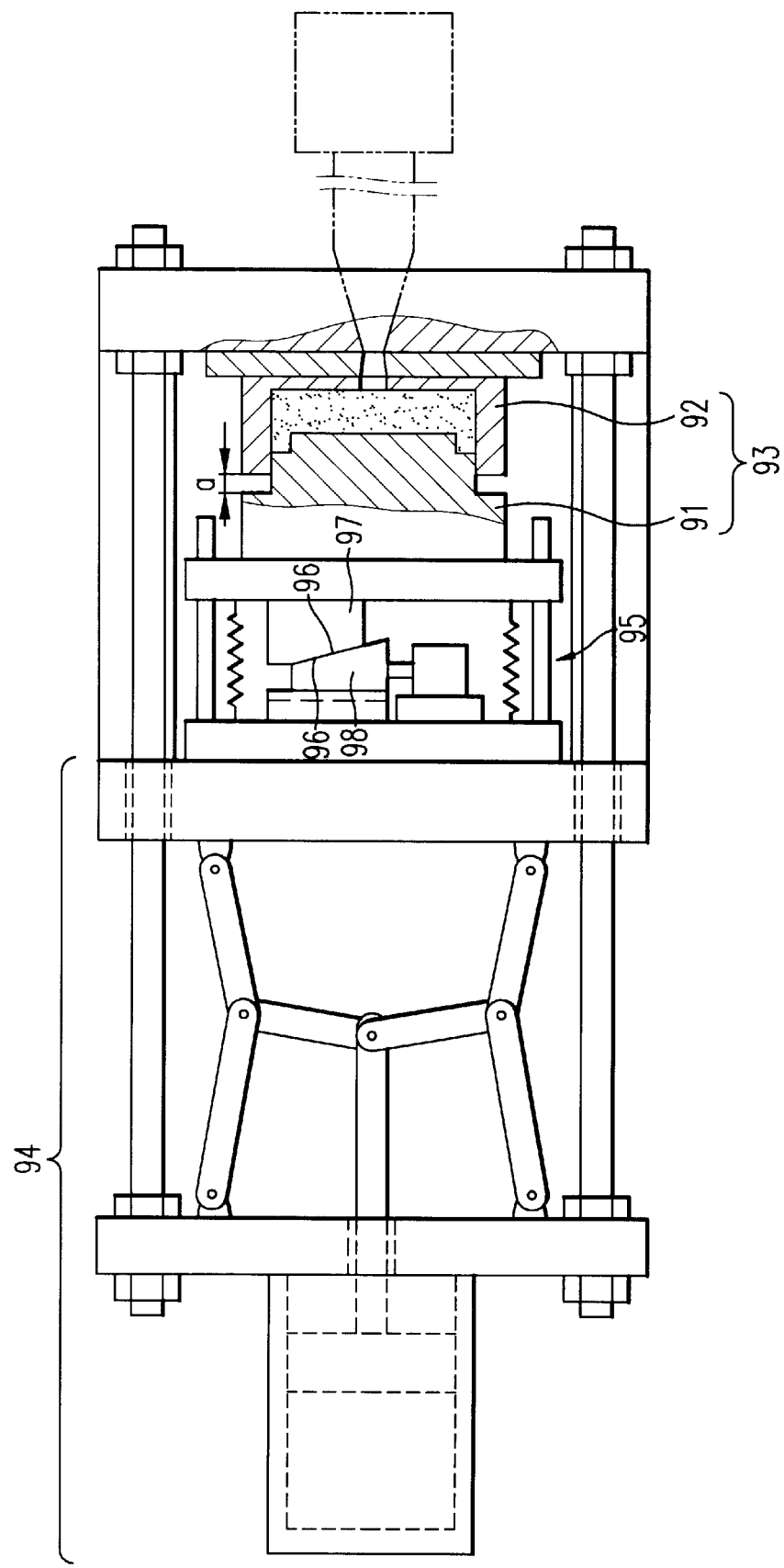
FIG. 16 is a view corresponding to FIG. 1 and showing a conventional injection compression molding machine.
Figure 17:
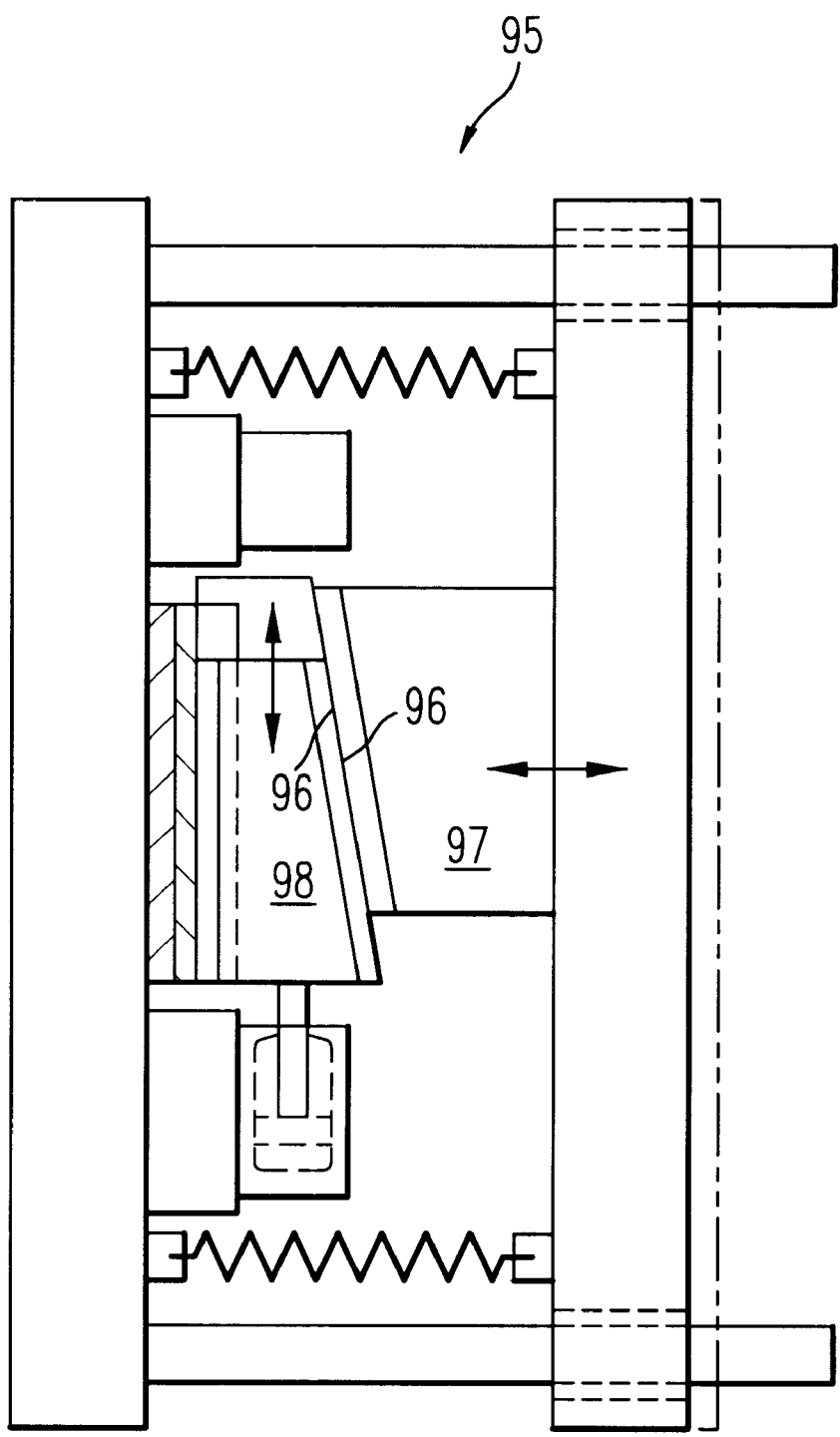
FIG. 17 is a side view showing the compression apparatus of the conventional injection compression molding machine.
Figure 18:
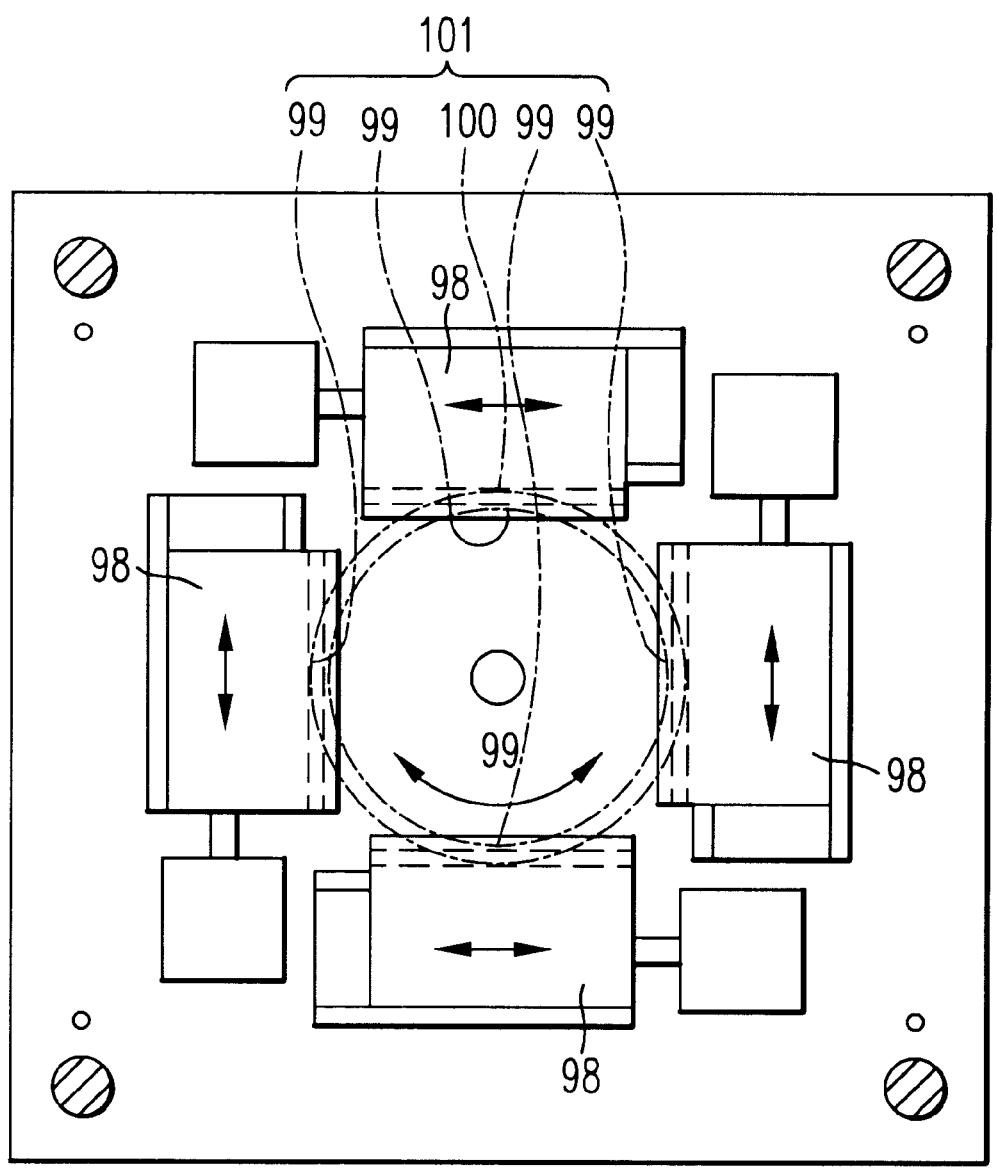
FIG. 18 is a front view showing the compression apparatus of the conventional injection compression molding machine.

FIG. 14 shows a sixth embodiment of the present invention. In the present invention, in place of the compression apparatus 20 which are used in the fourth and fifth embodiments and which has a plurality of slant members 61, a compression apparatus 20A having a single slant member 61 is used.

That is, in the compression apparatus 20A, one slant member 61, one hydraulic cylinder apparatus 64, and one interlock plate 66C are provided.

Of these components, the slant member 61 is disposed at a substantial center portion of the interlock plate 66C. An auxiliary slant member 71 is provided at each of four corners of the interlock plate 66C.

The present embodiment provides action and effects similar to those of the first and second embodiments. In addition, the present embodiment provides the following effect. That is, even though a single slant member 61 is provided, well-balanced pressing force can be applied to the movable mold 10B, so that the parallelism between the stationary mold 10A and the movable mold 10B is maintained when the movable mold 10B is advanced. Therefore, the compression apparatus 20 can be downsized further.

Although the fourth through sixth embodiments of the present invention have been described, the present invention should not be construed as being limited to these embodiments. Various modifications and changes of the design are possible within the scope of the present invention, and the abovedescribed structures may be employed in the fourth through sixth embodiments.

EXAMPLES

Next, the effects of the present invention will be described by way of specific examples.

Example

In an Example, a molding operation was experimentally performed by use of the injection compression molding machine and molding procedure according to the second embodiment.

Comparative Example

In a Comparative Example, molding operation was experimentally performed in the same manner as in the Example, except that the link member 41 was removed from the compression apparatus of the injection compression molding machine used in the Example.
(Common molding conditions)
In the Example and the Comparative Example, the following materials, die, apparatus, and molding method were used in common for molding.
(1) Material: polypropylene (IDEMITSU PP J-3050HP manufactured by Idemitsu Petrochemical Co., Ltd.: melt index=42 g/10 minutes; measured under the conditions of 230° C., 2.16 kgf)
(2) Die: Control panel test type; 1800 mm (length)×900 mm (width)×60 mm (height); mean wall thickness: 4 mm
(3) Injection compression molding machine: Injection molding machine Model J2200 (product of the Japan Steel Works, Ltd.; Distances between tie bars: 1800 mm (horizontal)× 1600 mm (vertical)), into which the compression apparatus of the present invention was built.
(4) Molding conditions
    1) Molding temperature: 230° C. (temperature of injection cylinder)
    2) Die temperature: 40° C.
    3) Injection pressure: 80 kg/cm$^2$ (gauge pressure)
    4) Injection speed: 60% (value set on the basis of maximum speed)
    5) Resin charging period: 7.5 seconds
    6) Timing of start of compression: 7 seconds after start of injection
    7) Compression amount (clearance a in FIG. 1): 2 mm
    8) Cooling period: 60 seconds
    9) Compression force: 150 t (maintained constant until completion of cooling)

(Results of experiments)

In the Example, there was obtained a molded article having a substantially uniform wall thickness (variation in wall thickness: ±0.05 mm or less) and which had neither warpage nor deformation.

In the Comparative Example, since the slant members 31 moving in different directions were not linked, a time lag was generated between their motions during the operation of the compression apparatus, so that the parallelism between the movable mold and the stationary mold was not maintained, and the compression force applied to the molten resin was biased. As a result, the wall thickness of the molded article became non-uniform (variation in wall thickness: ± about 0.4 mm), and no molded article having a uniform wall thickness was obtained.

Attempts were made to conduct the above-described experiments by use of the compression apparatus member which had been disclosed as an embodiment using a synchronization member in Japanese Patent Application Laid-Open (kokai) No. 7-164500. However, the experiments for comparison could not be conducted, since in the design process it was found that the compression apparatus was too large to be attached to the above-described injection compression molding machine.

INDUSTRIAL APPLICABILITY

As describe above, according to the present invention, compression force applied to the molten resin can be maintained uniform, a compression apparatus can be easily downsized, and the compression apparatus can be easily attached to a molding machine.

Also, according to a method of the present invention using an injection compression molding machine of the present invention, a molten resin injected into the interior of a die is compressed by means of the above-described compression apparatus for molding. Therefore, the size of a molded article is not limited, and a molded article having excellent shape and dimensional precision can be manufactured even if the molded article is large in size, because compression force is maintained uniform.

What is claimed is:

1. A compression apparatus adapted to be disposed behind a movable mold of a die of a molding machine in which molten resin is charged into the die, and the movable mold is advanced toward a stationary mold of the die so as to apply compression force to the molten resin, to thereby mold the molten resin, said compression apparatus comprising:

a first slanted portion and a second slanted portion forming a first set of first and second slanted portions, wherein each of said first slanted portion and said second slanted portion of said first set of said first and second slanted portions has a slant face slanted with respect to an advancement direction of the movable mold, said slant faces of said first and second slanted portions of said first set of first and second slanted portions being arranged along the advancement direction of the movable mold, said slant face of said first slanted portion being in surface contact with said slant face of said second slanted portion, and said first slanted portion and said second slanted portion being moved relative to each other in a direction perpendicular to the advancement direction of the movable mold, to thereby generate a pushing force which pushes the movable mold toward the stationary mold; and at least a second set of said first and second slanted portions to form a plurality of sets of first and second slanted portions, wherein said first set of said first and second slanted portions and said at least second set of first and second slanted portions move relative to each other in a moving direction, said first set of first and second slanted portions and said at least second set of first and second slanted portions are provided in a plane which extends perpendicular to the advancement direction of the movable mold;

at least one interlock plate engaged with any one of said first slanted portions of said first set of first and second portions and said at least second set of first and second portions and said second slant portions of said first set of first and second portions and said at least second set of first and second portions, said at least one interlock plate being disposed to be movable in said moving direction, wherein said at least one interlock plate is a plate-shaped rigid body which has an elongated hole extending along said moving direction of said first and second slanted portions;

a drive mechanism for driving said first and second slanted portions is disposed inside said elongated hole of said at least one interlock plate; and wherein said plurality of sets of said first and second slanted portions have said first slanted portions moving relative to said second slanted portions in a different direction than said moving direction and are provided in a plane which extends perpendicular to the advancement direction of the movable mold and any one of said first and second slanted portions are engaged with said at least one interlock plate disposed to be movable in a same direction as said moving direction of said first and second slanted portions, and said first and second slanted portions, having moving directions which differ from each other, are engaged with each other via a synchronization mechanism, wherein said synchronization mechanism comprises a link which is pivoted at a central portion thereof and is engaged with each of said first and second slanted portions at opposite end portions thereof.

2. The compression apparatus for molding according to claim 1, further comprising first and second auxiliary slanted portions, wherein any one of first auxiliary slanted portions corresponding to said first slanted portions and second auxiliary slanted portions corresponding to said second slanted portions are fixed to said at least one interlock plate and each of said first and second auxiliary slanted portions has a slant face which is slanted with respect to the advancement direction of said movable mold, said first and second auxiliary slanted portions are arranged along said advancement direction of said movable mold, and said slant faces are in surface contact with each other.

3. The compression apparatus for molding according to claim 1, wherein first auxiliary slanted portions corresponding to said first slanted portions and said secondary auxiliary slanted portions corresponding to said second slanted portions are fixed to said at least one interlock plate and each of said first and second auxiliary slanted portions has a slant face which is slanted with respect to said advancement direction of said movable mold, said first and second auxiliary slanted portions are arranged along said advancement direction of said movable mold, and said slant faces of said first and second auxiliary slanted portions are in surface contract with each other.

4. The compression apparatus for molding according to claim 1, wherein a single set of said first slanted portion and said second slanted portion is provided in a plane which extends perpendicular to said advancement direction of said movable mold, said first slanted portion and said second slanted portion being engaged with said at least one interlock plate which is disposed to be movable in said moving direction of said first and second slant portions, first auxiliary slanted portions corresponding to said first slanted portions and said second auxiliary slanted portions corresponding to said second slanted portions are fixed to said at least one interlock plate at positions spaced away from said first and second slanted portions along said moving direction of said first and second slanted portions and each of said first and second auxiliary slanted portions has a slant face which is slanted with respect to said advancement direction of said movable mold, said first and second auxiliary slanted portions are arranged along said advancement direction of said movable mold, and said slant faces of said first and second auxiliary slanted portions are in surface contract with each other.

5. The compression apparatus for molding according to claim 4, wherein said at least one interlock plate is a plate-shaped rigid body which has an elongated hole extending along said moving direction of said first and second slanted portions, and a drive mechanism for driving said slant portion is disposed inside said elongated hole.

6. The compression apparatus for molding according to claim 1, wherein first auxiliary slanted portions corresponding to said first slanted portions and second auxiliary slanted portions corresponding to said second slanted portions are fixed to said at least one interlock plate at positions spaced away from said first and second slanted portions along said moving direction of said first and second slanted portions are fixed to said at least one interlock plate at positions spaced away from said first and second slanted portions along said moving direction of said first and second slanted portions and each of said first and second auxiliary slanted portions has a slant face which is slanted with respect to said advancement direction of said movable mold, said first and second auxiliary slanted portions are arranged along said advancement direction of said movable mold, and said slant faces of said first and second auxiliary slanted portions are in surface contract with each other.

7. The compression apparatus for molding according to claim 1, wherein any one of first auxiliary slanted portions corresponding to said first slanted portions and second auxiliary slanted portions corresponding to said second slanted portions are fixed to said at least one interlock plate at positions spaced away from said first and second slanted portions along said moving direction of said first and second slanted portions are fixed to said at least one interlock plate at positions spaced away from said first and second slanted portions along said moving direction of said first and second slanted portions and each of said first and second auxiliary slanted portions has a slant face which is slanted with respect to said advancement direction of said movable mold, said first and second auxiliary slanted portions are arranged along said advancement direction of said movable mold, and said slant faces of said first and second auxiliary slanted portions are in surface contract with each other.

8. The compression apparatus for molding according to claim 1, wherein said synchronization mechanism comprises a link which is pivoted at a central portion thereof and is engaged with said slant portions at opposite end portions thereof.

9. An injection compression molding machine which includes a die comprising a movable mold and a stationary mold, and in which molten resin is charged into said die and said movable mold is advanced so as to apply compression force to the molten resin, to thereby mold the molten resin, said injection compression molding machine comprising:

a compression apparatus for molding which includes first and second slant portions each of which has a slant face slanted with respect to an advancement direction of said movable mold and which are arranged along said advancement direction of said movable mold, said slant face of said first slant portion being in surface contact with said slant face of said second slant portion, and said first slant portion and said second slant portion being moved relative to each other in a direction perpendicular to said advancement direction of said movable mold, to thereby generate pushing force which pushes said movable mold toward said stationary mold, wherein a plurality of sets each including said first slant portion and said second slant portions which move relative to each other in a same direction are provided in a plane which extends perpendicular to said advancement direction of said movable mold, any one of said first slant portions and said second slant portions being engaged with a single interlock plate which is disposed to be movable in said moving direction of said first and second slant portions, wherein said single interlock plate is a plate-shaped rigid body which has an elongated hole extending along said moving direction of said first and second slanted portions;

said compression apparatus for molding pushes said movable mold toward said stationary mold so as to compress the molten resin which has been charged into said die;

a drive mechanism for driving said first and second slanted portions is disposed inside said elongated hole of said single interlock plate; and wherein said plurality of sets of said first and second slanted portions have said first slanted portions moving relative to said second slanted portions in a different direction than said moving direction and are provided in a plane which extends perpendicular to the advancement direction of the movable mold and any one of said first and second slanted portions are engaged with said single interlock plate disposed to be movable in a same direction as said moving direction of said first and second slanted portions, and said first and second slanted portions, having moving directions which differ from each other, are engaged with each other via a synchronization mechanism, wherein said synchronization mechanism comprises a link which is pivoted at a central portion thereof and is engaged with each of said first and second slanted portions at opposite end portions thereof.

10. The injection compression molding machine according to claim 9, wherein a plurality of sets each including said first slant portion and said second slant portion which move relative to each other in a different direction are provided in a plane which extends perpendicular to said advancement direction of said movable mold; any one of said first and second slant portions are engaged with a single or a plurality of interlock plates disposed to be movable in the same direction as the moving direction of the slant portions; and slant members whose moving directions differ from each other are engaged with each other via a synchronization mechanism.

11. The injection compression molding machine according to claim 9, wherein said injection compression molding machine is constituted such that molten resin is injection into the interior of the die in a closed state with a clearance being left for further movement of the movable mold, and the compression apparatus then pushes the movable mold toward the stationary mold in order to apply compression force to the injected molten resin.

12. The injection compression molding machine according to claim 9, wherein a set of said first slant portion and said second slant portion is provided in a plane which extends perpendicular to said advancement direction of said movable mold, any one of said first slant portion and said second slant portion being engaged with a single interlock plate which is disposed to be movable in said moving direction of said first and second slant portions;

any one of first auxiliary slant portions corresponding to said first slant portions and second auxiliary slant portions corresponding to said second slant portions are fixed to said interlock plate at positions space away from said first and second slant portions along said moving direction of said slant portions;

each of said first and second auxiliary slant portions has a slant face which is slanted with respect to said advancement direction of said movable mold, said first and second auxiliary slant portions are arranged along said advancement direction of said movable mold, and said slant faces of said first and second auxiliary slant portions are in surface contact with each other; and said compression apparatus is capable of pushing said movable mold toward said stationary mold in order to compress molten resin injected into said die.

13. The injection compression molding machine according to claim 12, wherein said injection compression molding machine is constituted such that molten resin is injected into the interior of said die in a closed state with a clearance being left for further movement of said movable mold, and said compression apparatus then pushes said movable mold toward said stationary mold in order to apply compression force to the injected molten resin.

14. An injection compression molding method comprising the method steps of:

providing a compression apparatus for molding having first and second slant portions each of which has a slant face slanted with respect to an advancement direction of a movable mold which advances toward a stationary mold of a die into which molten melt is injected, said first and second slant portions being arranged along said advancement direction of said movable mold, said slant face of said first slant portion being in surface contact with said slant face of said second slant portion being moved relative to each other in a direction perpendicular to said advancement direction of said movable mold, to thereby generate pushing force which pushes said movable mold toward said stationary mold;

providing a plurality of sets each including said first slant portion and said second slant portions, which move relative to each other in a same direction, in a plane which extends perpendicular to said advancement direction of said movable mold, any one of said first slant portions and said second slant portions being engaged with a single interlock plate which is disposed to be movable in said moving direction of said first and second slant portions, wherein said single interlock plate is a plate-shaped rigid body which has an elongated hole extending along said moving direction of said first and second slanted portions;

after injection of the molten resin into said die, said compression apparatus for molding is operated to push said movable mold toward said stationary mold so as to compress the molten resin which has been charged into said die;

using a drive mechanism to drive said first and second slanted portions, said drive mechanism being disposed inside of said elongated hole of said single interlock plate; and moving said first slanted portions of said plurality of sets of said first and second slanted portions relative to said second slanted portions in a different direction than said moving direction, providing said first slated portions in a plane which extends perpendicular to the advancement direction of the movable mold, and engaging any one of said first and second slanted portions with said single interlock plate disposed to be movable in a same direction as said moving direction of said first and second slanted portions, wherein said first and second slanted portions, having moving directions which differ from each other, are engaged with each other via a synchronization mechanism, wherein said synchronization mechanism comprises a link which is pivoted at a central portion thereof and is engaged with each of said first and second slanted portions at opposite end portions thereof.

15. The injection compression molding method according to claim 14, wherein a plurality of sets each including said first slant portion and said second slant portion which move relative to each other in a different direction are provided in a plane which extends perpendicular to said advancement direction of said movable mold; any one of said first and second slant portions are engaged with a single or a plurality of interlock plates disposed to be movable in the same direction as the moving direction of the slant portions; and slant members whose moving directions differ from each other are engaged with each other via a synchronization mechanism.

16. The injection compression molding method according to claim 14, wherein molten resin is injected into the interior of said die in a closed state with a clearance being left for further movement of said movable mold, and saw compression apparatus then pushes said movable mold toward said stationary mold in order to apply compression force to the injected molten resin and close the die completely.

17. The injection compression molding method according to 14, wherein a set of said first slant portion and said second slant portion is provided in a plane which extends perpendicular to said advancement direction of said movable mold, any one of said first slant portion and said second slant portion being engaged with an interlock plate which is disposed to be movable in said moving direction of said first and second slant portions;

any one of first auxiliary slant portions corresponding to said first slant portions and second auxiliary slant portions corresponding to said second slant portions are fixed to said interlock plate at positions spaced away from said first and second slant portions along said moving direction of said slant portions;

each of said first and second auxiliary slant portions has a slant face which is slanted with respect to said advancement direction of said movable mold, said first and second auxiliary slant portions are arranged along said advancement direction of said movable mold, and said slant faces of said first and second auxiliary slant portions are in surface contact with each other; and after injection of the molten resin into said die, said compression apparatus for molding is operated to push said movable mold toward said stationary mold so as to compress the molten resin which has been charged into said die.

18. The injection compression molding method according to claim 17, wherein molten resin is injected into an interior of said die in a closed state with a clearance being left for further movement of said movable mold, said compression apparatus then pushes said movable mold toward said stationary mold in order to apply compression force to the injected molten resin, and close said die completely.

* * * * *